United States Patent [19]
Singh et al.

[11] Patent Number: 5,724,786
[45] Date of Patent: Mar. 10, 1998

[54] CONTROL SYSTEM HAVING ERROR CORRECTING APPARATUS

[75] Inventors: Ashok Singh, Chicago, Ill.; Robert Massey, Paddock Lake, Wis.; Olof Stark, Ystad, Sweden

[73] Assignee: Tetra Laval Holdings & Finance S.A., Pully, Switzerland

[21] Appl. No.: 475,396

[22] Filed: Jun. 7, 1995

Related U.S. Application Data

[63] Continuation-in-part of Ser. No. 315,414, Sep. 28, 1994.

[51] Int. Cl.$^6$ ........................................ B65B 57/08
[52] U.S. Cl. ........................ 53/52; 53/55; 53/64; 53/249
[58] Field of Search .......................... 53/52, 55, 64, 53/75, 76, 77, 249, 565

[56] References Cited

U.S. PATENT DOCUMENTS

| | | | |
|---|---|---|---|
| 2,757,498 | 8/1956 | Meyer-Jagenberg et al. | |
| 3,017,731 | 1/1962 | Lohse | 53/201 |
| 3,579,958 | 5/1971 | Hentges et al. | 53/379 X |
| 4,419,761 | 12/1983 | Kuze | 377/16 |
| 4,525,977 | 7/1985 | Matt | 53/55 |
| 4,566,251 | 1/1986 | Spisak et al. | 53/202 |
| 4,588,391 | 5/1986 | Evans et al. | 493/165 |
| 4,790,123 | 12/1988 | Ljungström | 53/458 |
| 4,807,420 | 2/1989 | Barker | 53/51 |
| 4,860,519 | 8/1989 | Lemaire et al. | 53/167 |
| 4,901,218 | 2/1990 | Cornwell | 364/131 |
| 4,912,623 | 3/1990 | Rantala et al. | 364/136 |
| 4,921,092 | 5/1990 | Crawford et al. | 198/460 |
| 4,924,657 | 5/1990 | Berti et al. | 53/55 X |
| 4,982,556 | 1/1991 | Tisma | 53/506 |
| 5,082,103 | 1/1992 | Ross et al. | 198/460 |
| 5,177,930 | 1/1993 | Harston et al. | 53/55 |
| 5,301,488 | 4/1994 | Ruhl et al. | 53/55 |
| 5,337,411 | 8/1994 | Harrison, Jr. | 395/200 |
| 5,347,791 | 9/1994 | Ginzl et al. | 53/55 X |
| 5,351,464 | 10/1994 | Francioni | 53/55 X |
| 5,419,099 | 5/1995 | Mueller et al. | 53/473 |

FOREIGN PATENT DOCUMENTS

| | | |
|---|---|---|
| 638616 | 4/1972 | Italy. |
| 678935 | 11/1991 | Switzerland. |

*Primary Examiner*—James F. Coan
*Attorney, Agent, or Firm*—McAndrews, Held & Malloy, Ltd.; Michael A. Catania

[57] ABSTRACT

A servomotor driven machine under control of a control system which compensates for the slip and other errors associated with indirectly driving a movable component of the machine with a servomotor is set forth. The control system includes a servomotor that is connected through an intermediate drive mechanism to drive the movable component from a start position to an end position. A sensing system is disposed on the apparatus for generating an output signal indicative of at least one motion characteristic of the movable component. A controller drives the servomotor in accordance with a predetermined motion profile. The predetermined motion profile defines the motion characteristics of the movable component as the movable component moves from the start position to the end position within a predetermined time frame. The controller is responsive to the output signal of the sensing system to compensate for movement errors caused by the intermediate drive mechanism by deviating from the predetermined motion profile.

50 Claims, 32 Drawing Sheets

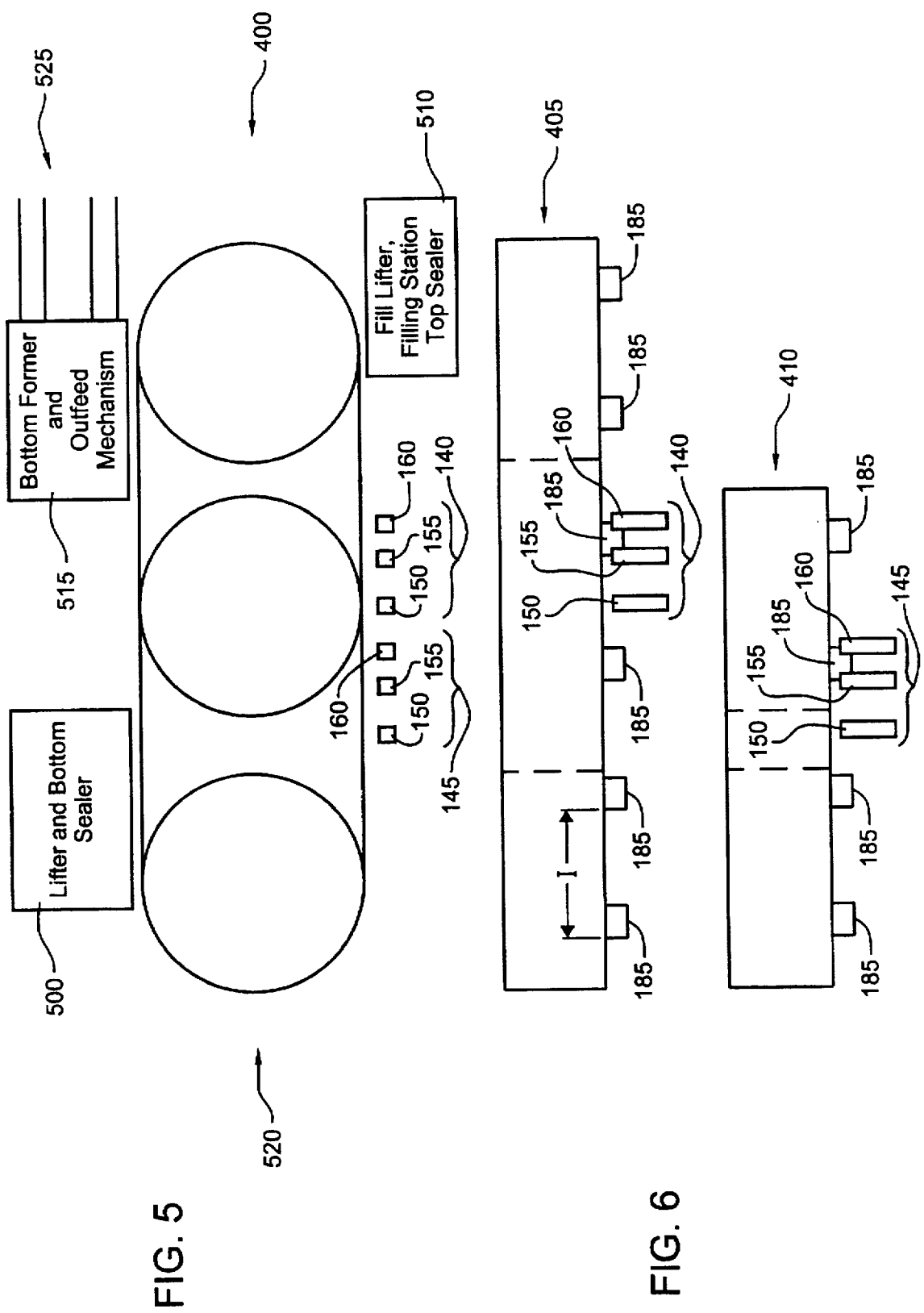

BOTTOM FORMER LIFT POSITION PROFILE

CONTROL SYSTEM HAVING ERROR CORRECTING APPARATUS

CROSS-REFERENCE TO RELATED APPLICATIONS

This application is a continuation-in-part of U.S. Ser. No. 08/315,414 filed Sep. 28, 1994.

TECHNICAL FIELD

The present invention relates to a control system for a servomotor driven machine. More particularly, the present invention relates to a control system for a packaging machine that utilizes an error correction apparatus for limiting errors induced by an intermediate drive mechanism connecting a servomotor to a movable component of a drive apparatus.

BACKGROUND

Packaging machines are known that integrate the various components necessary to fill and seal a container into a single machine unit. This packaging process, generally stated, includes feeding carton blanks into the machine, sealing the bottom of the cartons, filling the cartons with the desired contents, sealing the tops of the cartons, and then off loading the filled cartons for shipping. The motion and I/O control of the packaging machine may be undertaken by an electronic control system.

Trends within the field of packaging machines point toward increasingly high capacity machines intended for rapid, continuous filling and sealing of a very large number of identical or similar packaging containers, e.g., containers of the type intended for liquid contents such as milk, juice, and the like. One such machine is disclosed in U.S. Ser. No. 08/190,546, filed Feb. 2, 1994, which is hereby incorporated by reference and the enhancements thereto that are disclosed un U.S. Ser. No. 08/354,313, filed Sep. 28, 1994, which is likewise incorporated by reference. The machines disclosed in these applications include a plurality of processing stations, each station implementing one or more processes to form, fill, and seal the containers. Each of the processing stations is driven by one or more servomotors that drive the various components of each of the processing stations.

Generally stated, a servomotor can be attached to directly drive an apparatus or to indirectly drive an apparatus. The machines disclosed in the '546 application and the continuation-in-part '414 application include several indirectly driven apparatus. An indirectly driven apparatus is one wherein a moving component, such as a lifter mechanism, conveyor belt, etc., are connected to be driven by a servomotor through an intermediate drive mechanism, such as a gear box or drive belt.

For a servo controlled packaging machine to perform properly, the machine's repeatability of motion should be within design specifications. In most cases, the movement of the various moving components of the machine along all motion axes must be controlled within very small tolerances. For example, within a packaging machine of the type disclosed in the aforementioned applications, the moving component of each servomotor driven apparatus may be required to stop within ±0.5 mm of a designated stop position. For an apparatus that is directly driven by a servomotor, the ability to stop at a designated position is typically not a problem since the servomotor sensors directly measuring servomotor position are generally quite accurate and may be monitored by the associated servomotor control system. However, when the servomotors are linked via belts, chains, gearboxes, etc., to indirectly drive the moving components, the backlash and wear of gearboxes and the flex in the belts and chains associated with the intermediate drive mechanism may cause the final stopping position to be outside the acceptable tolerance limits or otherwise cause motion errors in the movement of the moving components. Such motion errors can cause failure of the operation of the machine, particularly when a large number of motion axes are being controlled by the servomotor control system.

SUMMARY OF THE INVENTION

A servomotor driven machine under control of a control system which compensates for the slip and other errors associated with indirectly driving a movable component of the machine with a servomotor is set forth. The control system includes a servomotor that is connected through an intermediate drive mechanism to drive the movable component from a start position to an end position. A sensing system is disposed on the apparatus for generating an output signal indicative of at least one motion characteristic of the movable component. A controller drives the servomotor in accordance with a predetermined motion profile. The predetermined motion profile defines the motion characteristics of the movable component as the movable component moves from the start position to the end position within a predetermined time frame. The controller is responsive to the output signal of the sensing system to compensate for movement errors caused by the intermediate drive mechanism by deviating from the predetermined motion profile.

BRIEF DESCRIPTION OF THE DRAWINGS

FIGS. 5 and 6 are schematic illustrations of a packaging machine including a plurality of processing stations that each include one or more servo driven mechanisms.

DETAILED DESCRIPTION OF THE PREFERRED EMBODIMENT

Figure 1:
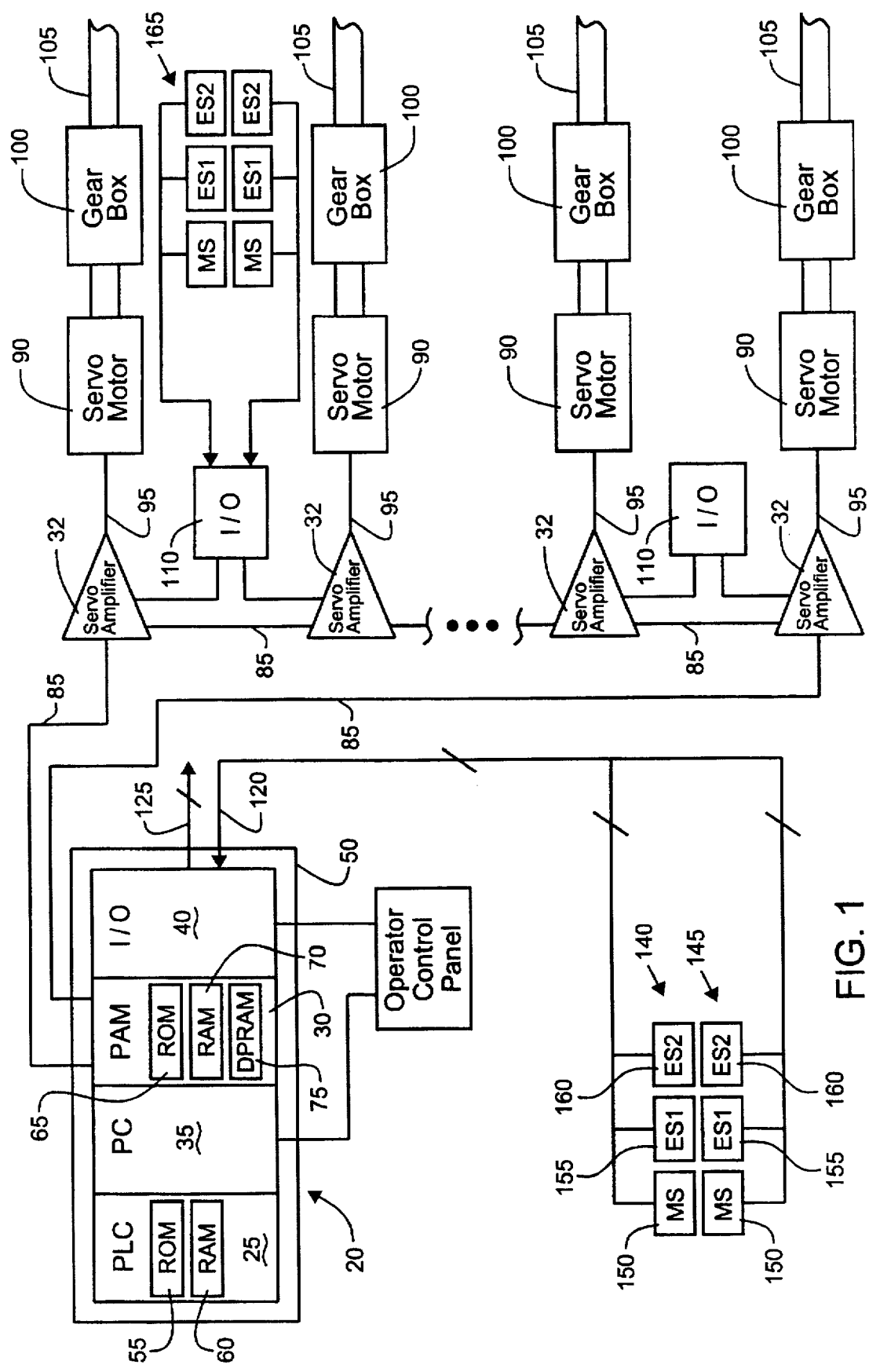
FIG. 1 is a schematic block diagram illustrating one embodiment of a control system for controlling the operation of the movable components of a machine.

FIG. 1 is a schematic block diagram illustrating one embodiment of a control system for controlling the operation of a plurality of movable components of a machine, such as a packaging machine of the type described in the foregoing patent applications. The illustrated control system includes a controller, shown generally at 20, and includes a programmable logic controller ("PLC") 25 and/or a programmable axis manager ("PAM") 30, depending on the demands placed on the control system, and servo amplifiers 32. A single PLC without a corresponding PAM, for example, may be utilized in instances in which the control system must respond and control a large number of I/O signals while, at the same time, controlling motion along a minimal number of axes. A single PAM, however, may be utilized in instances where it is necessary to control a large number of motion axes, but in which the system need not control and respond to a large number of I/O signals. The illustrated controller 20 uses both a PAM 30 and a PLC 25, and, as such, may respond to and control a large number of I/O signals as well as effect motion control of a large number of motion axes. Controller 20 may also include an industrial PC 35 and an I/O interface unit 40. The PLC 25, PC 35, PAM 30, and I/O interface unit 40 may all be disposed in a bus rack 50 for communication with one another. Communication between the PLC 25 and the PAM 30 may ensue at a high data rate using, for example, the communications programs described in the '414 patent application. The bus rack 50, may be a VME bus, a SIMATIC S5 bus, or any other bus that is capable of supporting multiple processors.

As illustrated, the PLC 25 includes a ROM 55 and a RAM 60. The ROM 55 includes, for example, the software that is required to program and run the PLC 25 and, for example, may include $E^2$ PROM for storing the ladder logic programming and motion profiles associated with the components that are to be driven by the control system. The PAM 30 includes a ROM 65, a RAM 70, and a DPROM 75. The ROM 65 includes the programs necessary to operate and program the PAM 30 and, for example, may include $E^2$ PROM for storing the user program, including motion profiles associated with the various components that are to be driven by the control system.

The PAM 30 is connected for communication with a plurality of servo amplifiers 32 along one or more lines 85 which may constitute, for example, an optical ring network. The servo amplifiers 32, in turn, are each connected for control of a respective servomotor 90 along lines 95. The servomotors 90, are connected to drive the various movable components of a machine, either directly, or indirectly through an intermediate drive mechanism 100, such as a belt or gearbox. In the illustrated embodiment, the intermediate drive mechanisms 100 connect the servomotors 90 to respective drive shafts 105 that drive the movable components of the apparatus.

By way of example, the servo amplifiers 32 may each be a Model ST-1 servomotor amplifier and the PAM 30 may be a programmable axes manager, both of which are manufactured and available from Socapel. Similarly, by way of example, the PLC 25 may be a Model 9070 programmable logic controller that is available from GE Fanuc.

In the case where one or more Model ST-1s are used to implement the system, the servo amplifiers 32 may be used to sense and propagate I/O signals through, for example, I/O interface circuits 110. The status of sensor inputs as well as the control of actuating outputs to and from the I/0 circuit 110 are communicated along the optical ring network.

The PLC 25 is in communication with the I/O interface unit 40. The I/O interface unit 40 receives and sends I/O sensor and control signals along lines 120 and 125. In accordance with the present invention, a plurality of sensors are connected to send their respective output signals along lines 120 and 125 to the I/O interface unit 40 which communicates the state of the sensor signals to the PAM 30 and/or PLC 25. Included in the plurality of sensors are sensor arrays 140 and 145 each respectively associated with a movable component of the machine that is indirectly driven by its respective servomotor. Each sensor array 140 and 145 includes at least one mid-sensor 150 that is disposed on the apparatus to directly measure a motion characteristic (position, velocity, acceleration) of the movable component as it moves in accordance with a predetermined motion profile that is stored in the controller 20. Additionally, each sensor array 140 and 145 may include one or more end sensors 155, 160 disposed to determine when the respective movable component has reached, for example, its stop position, or another position at the end of the range of movement of the movable component as determined by the predetermined motion profile for that component stored in the controller 20. Although the sensors heretofore discussed are illustrated as being connected to the I/O interface unit 40, the sensors may likewise be connected for receipt and transmission by the I/O interface circuits 100 of the servoamplifiers 32. This latter manner of connection is illustrated at 165 of FIG. 1.

Figure 2:
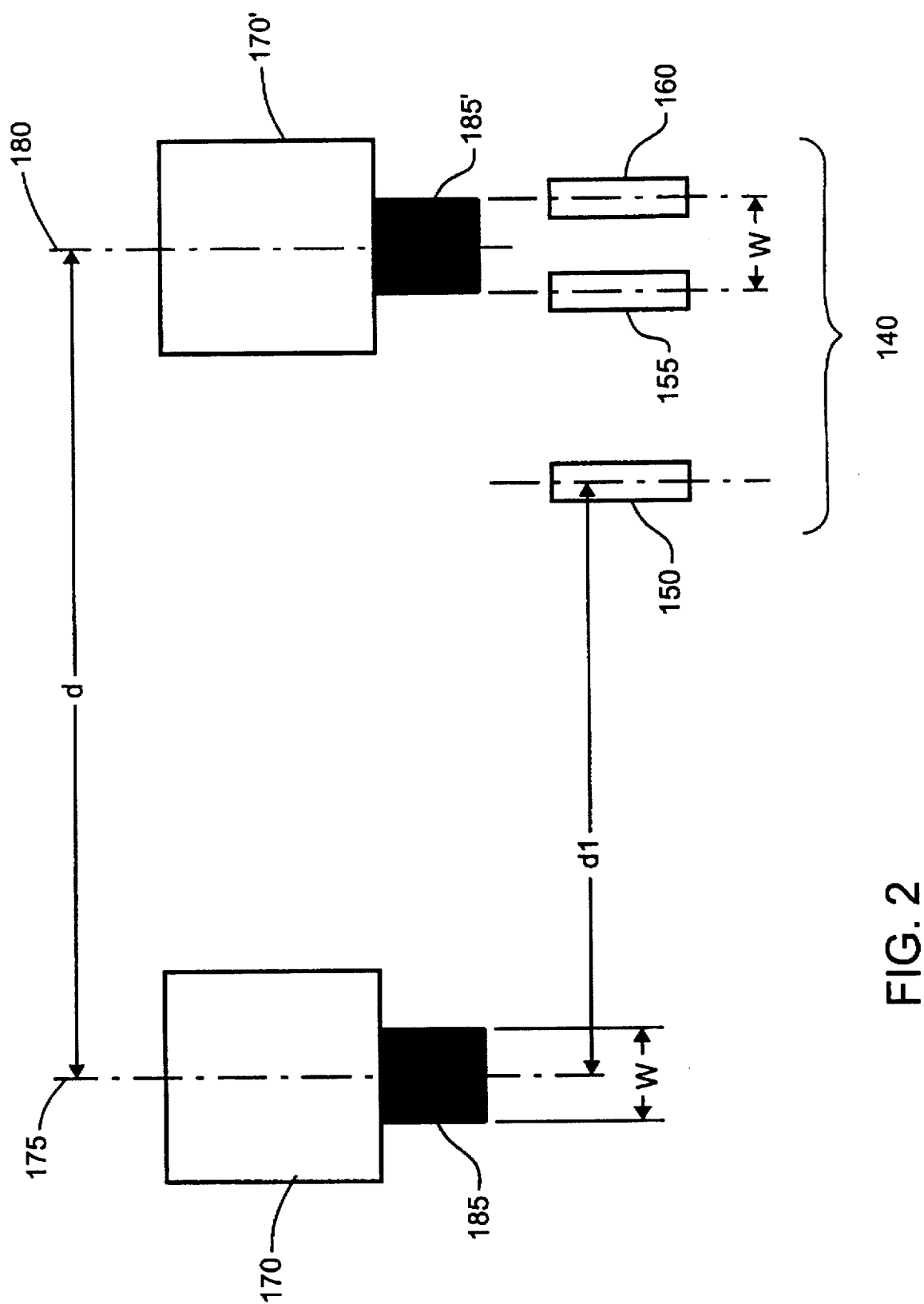
FIG. 2 is a schematic diagram illustrating one embodiment of a sensing system used in the control system of FIG. 1.

FIG. 2 is a block diagram illustrating the use of the mid-sensor 150 and end sensors 155 and 160 in connection with a movable component 170 that is indirectly driven by a servomotor along, for example, a linear axis. The distance the movable component 170 moves is represented here by d and is defined by a start position 175 and an end position 180. The movable component 170 is driven between the start position 175 and end position 180 by the respective servomotor in accordance with a predetermined motion profile that is stored in the controller 20 for component 170. In accordance with the stored motion profile, the movable component 170 is to be driven from the start position 175 to the end position 180 within a predetermined time frame t.

A flag member 185 is disposed for co-movement with the movable component between first and second positions. In the illustrated embodiment, the first and second positions correspond directly to the start position 175 and end position 180, respectively, since the flag member is directly affixed to the movable component 170. The flag member 185 is of the type that may be sensed by the sensors 150, 155, and 160. For example, if sensors 150, 155, and 160 are infrared sensors, the flag member 185 may be an opaque member which disrupts an infrared beam of the sensors. Flag member 185 may be formed from a magnetic material when Hall effect sensors are used. The sensors may likewise be mechanical switches that are actuated by the flag member 185. Other sensor/flag member combinations are likewise suitable for use.

The width of the flag F is w, which is also the distance between the end sensors 155 and 160. The controller 20 determines that the movable component has reached its end position when both end sensors 155 and 160 go to an active state. However, if either end sensor 155 or 160 is inactive at the end of time frame t, the controller 20 assumes that the actual end position of movable component 170 is outside the acceptable limits for the next motion to continue and, for example, shuts down operation of the machine. Failure of the movable component 170 to reach end position 180 within time frame t is often the result of slippage or other errors caused by the intermediate drive mechanism 100.

Mid-sensor 150 is utilized to assist in ensuring that the movable component 170 reaches the end position 180 by the end of the predetermined time frame t. Mid-sensor 150 is placed at a distance d1 from the start position 175 of the move of the movable component 170 and senses flag member 185 as the flag member passes position d1 on its way to end position 180 during execution of the predetermined motion profile. Any one of the motion characteristics of the movable component 170 may be determined by sensing flag member 185. In the presently illustrated embodiment, the mid-sensor 150 provides an output signal indicating that the flag member is present at position d1.

Figure 3:
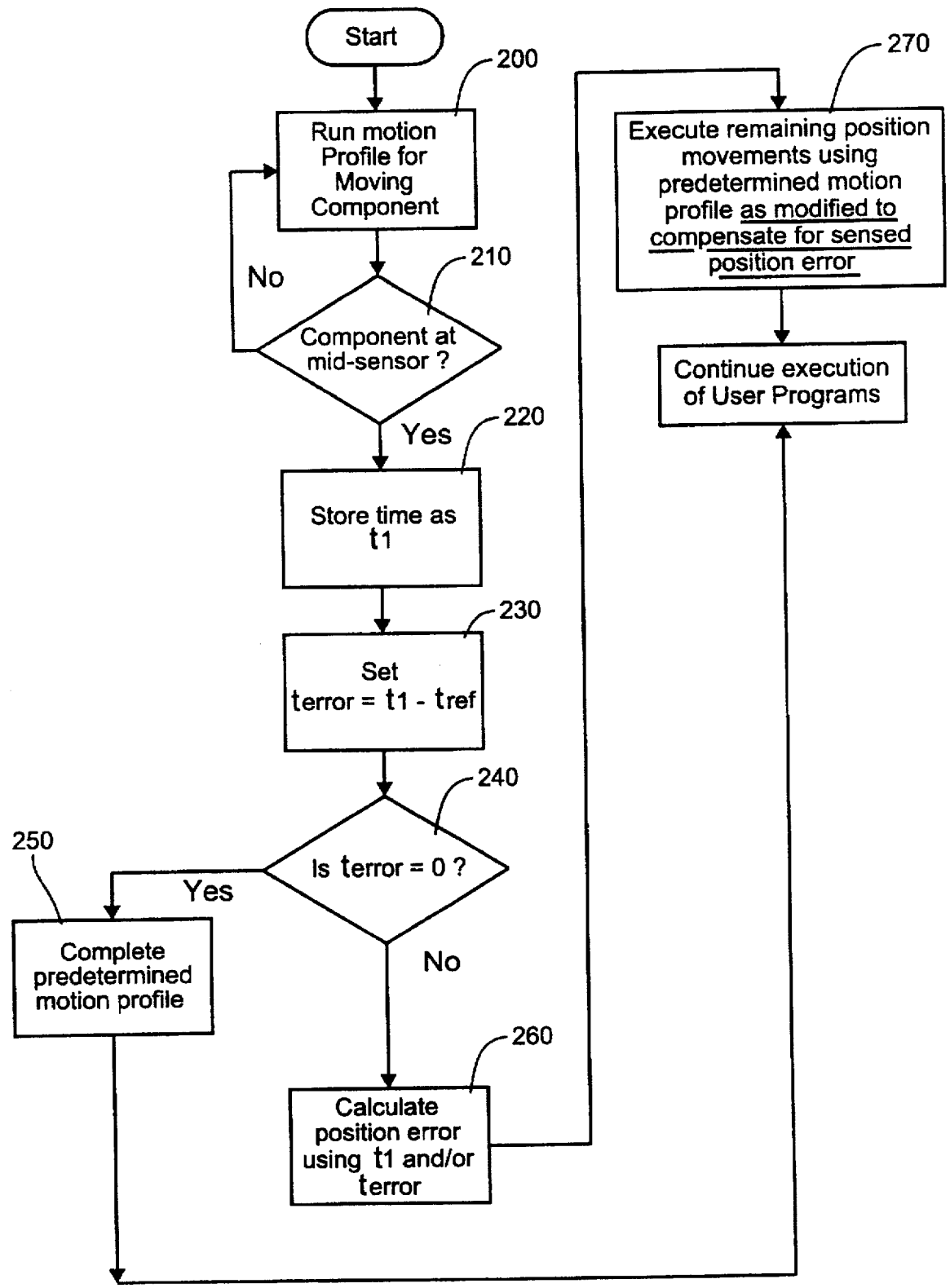
FIG. 3 is a flow diagram illustrating one manner in which the sensing system of FIG. 2 may be used to correct errors caused by an intermediate drive mechanism that connects a servomotor to the movable component of an apparatus.

One manner of using the information inherent in the sensing of flag member 185 is illustrated in the flow chart of FIG. 3. As illustrated, the controller 20 controls the servomotor 90 to execute the predetermined motion profile at step 200. The controller 20 then performs a check to ascertain whether the movable component 170 has reached position d1. This is done by monitoring the status of mid-sensor 150 at step 210 to determine when the output signal from the sensor 150 goes to an active state indicating the presence of flag member 185 at position d1. If the flag member 185 has not been sensed, the controller 20 continues to control the servomotor 90 in accordance with the predetermined motion profile stored in the controller 20. Upon sensing the presence of flag 185 at position d1, the controller 20 notes the time of the occurrence and stores this time as a time value $t_1$ at step 220. The value of $t_1$ is compared to a reference time value $t_{ref}$ at step 230 to generate an error value $t_{error}$. The reference time value $t_{ref}$ corresponds to the time that flag member 185 should have passed position $d_1$ in the absence of any error or slippage caused by the intermediate drive mechanism. If $t_{error}$ is equal to zero, or is otherwise within system tolerance limits as determined at step 240, the controller 20 continues controlling the servomotor at step 250 in accordance with the predetermined motion profile until complete. If an error beyond system tolerances is detected, the controller 20 modifies the predetermined motion profile to compensate for the error and subsequently uses the modified motion profile to complete execution of the motion of the movable component 170. This ensures that the movable component 170 will reach end position 180 within the time frame t allotted for its movement.

The motion profile may be modified by altering one or more of the motion characteristics of the predetermined motion profile. In the manner illustrated in FIG. 3, the position error may be calculated by the controller at step 260. Depending on the particular motion profile that is utilized, the position error may be calculated using the following formula:

$$\Delta position = (d_1/t_{ref}) * t_{error}$$

Other calculations using the value of $t_1$ may also be utilized. The position error may also be determined through use of a look-up table wherein the value of $t_1$ is used to determine the corresponding position error. Notwithstanding the manner in which the position error is ascertained, the resulting error value is used at step 270 to modify the predetermined motion profile to compensate for the sensed position error. This may be done, for example, by adding the position error value to a subsequent position point in the predetermined motion profile. In such instance, the controller 20 commands the servomotor to go to a subsequent, error-compensated position $$P_{comp} = P_{uncomp} - \Delta position$$

where $p_{uncomp}$ is the position associated with the predetermined motion profile without error compensation. The controller thus compensates for the position error in a single step, all subsequent position commands corresponding to the predetermined motion profile without further compensation. Although the single-step compensation technique may be useful where the position error is small, large position errors may result in substantial jerking of the movable component. This jerking is not desirable. Accordingly, the position error may be corrected by dividing the error among the remaining position steps executed by the controller 20 to drive the movable component 170 between position $d_1$ and the end position 180. The controller 20 then causes the servomotor to go to a series of subsequent, error-compensated positions $$P_{comp(N)} = P_{uncomp(N)} - (\Delta position/S)$$

where S is the number of position steps in the motion profile between $d_1$ and end position 180 over which the error is compensated. It will be recognized that the value of S may be less than the total number of position steps between $d_1$ and end position 180 so long as it is large enough to reduce the amount of jerking of the movable component 170. In each instance, the controller 20 executes the remaining modified position profile at step 270 within defined torque, speed, etc., limits.

Figure 4:
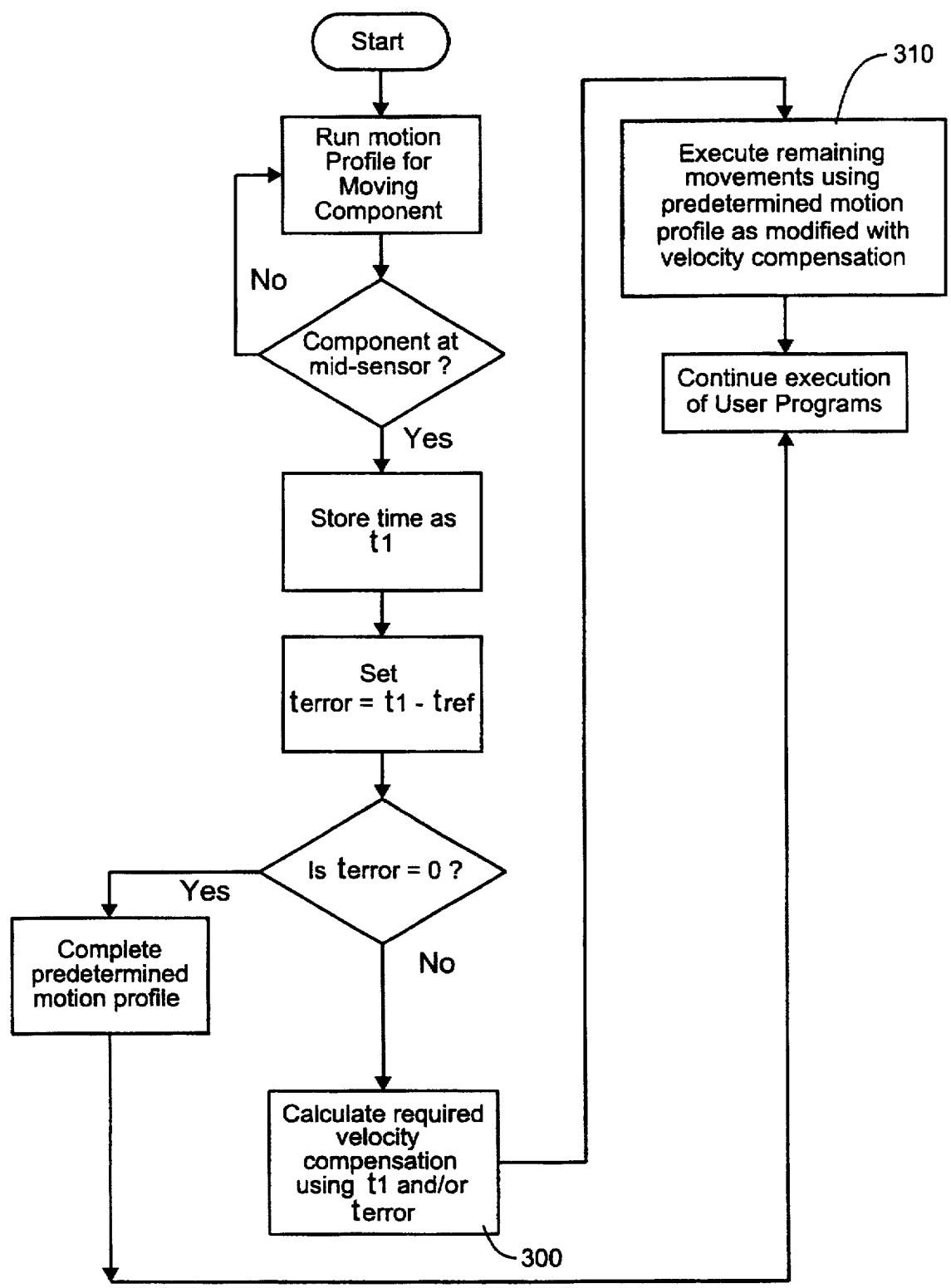
FIG. 4 is a flow diagram illustrating a further manner of correcting errors using the sensing system of FIG. 2.

As an alternative to directly modifying the position steps of the predetermined motion profile, the controller 20 may use the value of $t_1$ or $t_{error}$ to modify the velocity components of the predetermined motion profile. This manner of compensation is illustrated at steps 300 and 310 of FIG. 4. In such instance, the controller 20 causes the servomotor to drive the movable component 170 at an average velocity $$V_{comp} = D_{remaining}/(t_{remaining} - t_{error})$$

where $D_{remaining}$ is the distance between position $d_1$ and end position 180, and $t_{remaining}$ is the time remaining within time frame t to complete movement of the movable component 170 to end position 180. The value of $t_{remaining}$ is a constant corresponding to the following:

$$t_{remaining} = T - t_{ref}$$

where T is the predetermined time frame in which the motion profile is performed. The controller 20 executes the remaining modified position profile at step 310 within defined torque, speed, etc., limits so as not to damage or unnecessarily wear the machine.

FIGS. 5 and 6 are schematic illustrations of a packaging machine system such as the one disclosed in the aforementioned '546 application and '414 application which may use the foregoing control system. Although any of the illustrated modules may use the presently disclosed error compensation system, the implementation of the system in the context of the packaging machine will be described in connection with the endless belt conveyors utilized by the packaging machine.

As shown, the packaging machine, shown generally at 400, includes an upper endless belt conveyor 405 and a lower endless belt conveyor 410. The upper endless belt conveyor 405 is driven by a pair of pulley wheels that are indirectly driven by a respective servomotor through a gear mechanism, drive belt, or the like. The lower endless belt conveyor is also driven by a pair of pulley wheels that are indirectly driven by a respective servomotor. The conveyors may be constructed in accordance with the teachings of U.S. Ser. No. 08/282,981, filed Jul. 29, 1994, and incorporated herein by reference.

A plurality of flag members 185 project from each of the endless belt conveyors 405 and 410. The flag members 185 of the upper conveyor 405 are spaced from one another by a distance I corresponding to the distance that the control system 20 drives the conveyor 405 during a single indexed movement. The flag members 185 of the lower conveyor 410 are likewise spaced from one another a distance corresponding to the distance that the control system 20 drives conveyor 410 during a single indexed movement. Sensor bank 140 is disposed to monitor the flag members 185 of the upper conveyor 405 while sensor bank 145 is disposed to monitor the flags of the lower conveyor 410.

A plurality of processing stations 500, 510, and 515 are disposed about the periphery of the endless belt conveyors 405 and 410. The processing stations 500, 510, and 515 each have their respective mechanical components driven by one or more servomotors that control the movable components of the station in accordance with predetermined motion profiles that are stored in the controller 20. The need for service of the conveyors and packaging station components may be detected and handled in any of the manners set forth in U.S. Ser. No. 08/475,398 (Attorney Docket No. 10623US03), entitled "Diagnostic System for a Servomotor Driven Apparatus," filed on even date, which is hereby incorporated by reference.

The lower conveyor 410 receives erected carton blanks at end 520 and transports the carton blanks to processing station 500 in an indexed movement. The indexed movement is executed in accordance with the predetermined motion profile stored in the controller 20 for the lower conveyor 410. This predetermined motion profile may be modified in any one of the manners previously described using mid-sensor 150 of sensor bank 145. This ensures that the indexed movement is completed within the predetermined time frame t allocated for execution of the motion profile thereby presenting the carton blanks to the station 500 at the proper position for further processing by the end of the allotted time frame. Sensors 155 and 160 of sensor bank 145 are monitored by the controller 20 to ensure that the flag member 185 indeed reaches the end position of the indexed movement. If flag member 185 fails to reach the end sensors 155 and 160 within the allotted time, a system failure is detected by the controller and an emergency shut-down procedure is implemented. Such a system failure may likewise result if the mid-sensor 155 of sensor bank 145 is not detected within time frame t.

Processing station 500 may include a lifter mechanism and a bottom sealer mechanism. The lifter mechanism may be constructed in accordance with the teachings of U.S. Ser. No. 08/315,410 filed Sep. 28, 1994 (Attorney Docket No. 10325US01; Corporate Docket No. TRX-0043) entitled "Belt Driven Linear Transport Apparatus for a Packaging Machine", and U.S. Ser. No. 08/315,401 filed Sep. 28, 1994 (Attorney Docket No. 10602US01; Corporate Docket No. TRX-0044) entitled "Lifter Mechanism Employing a Carton Gripper and Carton Bottom Seal Configuration for Same". The bottom sealer mechanism may be constructed in accordance with the teachings of U.S. Ser. No. 08/315,412 filed Sep. 28, 1994 (Attorney Docket No. 10454US01; Corporate Docket No. TRX-0082), entitled "Ultrasonic Carton Sealer".

In operation, the lifter mechanism transports the erected cartons in groups from the lower conveyor 410 to the upper conveyor 405. At the upper conveyor 405, the bottoms of the cartons are sealed, for example, with the previously noted sealing apparatus using ultrasonic energy.

The upper conveyor 405 then transports the cartons to processing station 510, the control system 20 correcting for any errors caused by the intermediate drive mechanism. Processing station 510 may include a fill lifter mechanism, a plurality of filling nozzles respectively associated with each of the cartons, and a top sealer. The fill lifter may be constructed in accordance with the teachings of the aforementioned '410 application (Attorney Docket No. 10325US01; Corporate Docket No. TRX-0043) and '401 application (Attorney Docket No. 10602US01; Corporate Docket No. TRX-004), while the top sealer may be constructed in accordance with the teachings of the aforementioned '412 application (Attorney Docket No. 10454US01; Corporate Docket No. TRX-0082). At processing station 510, the fill lifter lifts the cartons to a position proximate the fill nozzles and gradually lowers the cartons as product is dispensed into them. Once the cartons have been filled, the top sealer seals the carton into the familiar gabled top configuration.

After the tops of the cartons have been sealed, the upper conveyor 405 transports the cartons to processing station 515, the control system 20 still compensating for errors. Processing station 515 may include a bottom forming mechanism and an outfeed mechanism. The bottom forming mechanism, for example, may be constructed in accordance with the teachings of U.S. Ser. No. 08/315,403 filed Sep. 28, 1994 (Attorney Docket No. 10599US01; Corporate Docket No. TRX-0064), entitled "Vacuum Operated Bottom Former", and the outfeed mechanism may be constructed in accordance with the teachings of either U.S. Ser. No. 08/315, 409 filed Sep. 28, 1994 (Attorney Docket No. 10594US01; Corporate Docket No. TRX -0113), entitled "Apparatus for Transferring Containers to a Moving Conveyor") or U.S. Ser. No. 08/315,404 filed Sept. 28, 1994 (Attorney Docket No. 10610US01; Corporate Docket No. TRX-0118), likewise entitled "Apparatus for Transferring Containers to a Moving Conveyor". At processing station 515, the bottom forming mechanism forms the bottom of the cartons to allow them to sit properly in an erect state. After the bottoms have been formed, the outfeed mechanism transfers the cartons to a distribution system, shown here as a dual line conveyor 525.

The use of gearboxes and cams, driven by constant velocity motors, to effect mechanism motions usually constrains the mechanism motions to constant velocity, or sinusoidal acceleration, or "modified sine" acceleration profiles. The present system is not constrained in this fashion. Rather, the present system facilitates implementation of motion profiles that enable, not just the movement of a mechanism from a start position to an end position in time t, but also profiles with accelerations and velocities that can be tailored to minimize the constraints that, for example, servo-amplifier current and voltage limits or product viscosities impose.

The foregoing system may be utilized in connection with any predetermined motion profile associated with any movable component of the packaging system. As such, the particular aspects of the predetermined motion profiles of the components are not necessarily important to the practice of the present invention. Nevertheless, it may be useful to describe some of the motion profiles that may be implemented using the disclosed system.

Motion profiles to be executed by the disclosed system using Socapel products, are coded as sequences of positions $p_i$ that vary from 0 to 1. Prior to execution of any particular motion profile the PAM 30:

1) multiplies each $p_i$ by a signed (+/−) scale factor equivalent to the maximum angular distance that we want the motor to rotate during any one machine cycle; and 2) adds to each scaled $p_i$ a signed offset magnitude that shifts the initial $p_i$ (and all subsequent $p_i$) forward or backward from the motor zero position.

The PAM 30 then assumes:

1) that the sequence of positions to be achieved by the motor during runtime will be spread out over the time of one machine cycle; and 2) the time interval between two adjacent $p_i$ is the same as any other two adjacent $p_i$.

Then the PAM 30 associates:

$p_0$ with $t_0$ $p_1$ with $t_1 = t_0 + \Delta t$ $p_2$ with $t_2 = t_1 + \Delta t$ $p_j$ with $t_j = t_{j-1} + \Delta t$ where $\Delta t$ = machine cycle time/(#$p_i$–1).

An ideal motion profile may be defined in terms of the accelerations (sinusoidal, cosinusoidal, and constant) and positions that the motor is to achieve over the time of a machine cycle. Data points along the ideal position, velocity, and acceleration profiles may then be selected to preserve the shape of the acceleration curve. In practice, this may be between 90 and 360 samples per profile.

To ensure that the PAM 30 and the servomotors 90 are programmed with position profiles that they can execute smoothly, it is presently desirable to create position profiles that are derived from sequences of constant accelerations. To achieve this, the velocity profile that satisfies the initial acceleration and position profiles is utilized. Assuming that each velocity ($v_i$) will be achieved via a constant acceleration, each necessary acceleration ($s_i$) is calculated. The position points $p_i$ are then determined based on the following equation:

$$p_i = p_{i-1} + (v_{i-1} * \Delta t) + (\tfrac{1}{2} * s_{i-1} * \Delta t)^2.$$

The following motion profiles may be implemented using the foregoing method.

Figure 7:
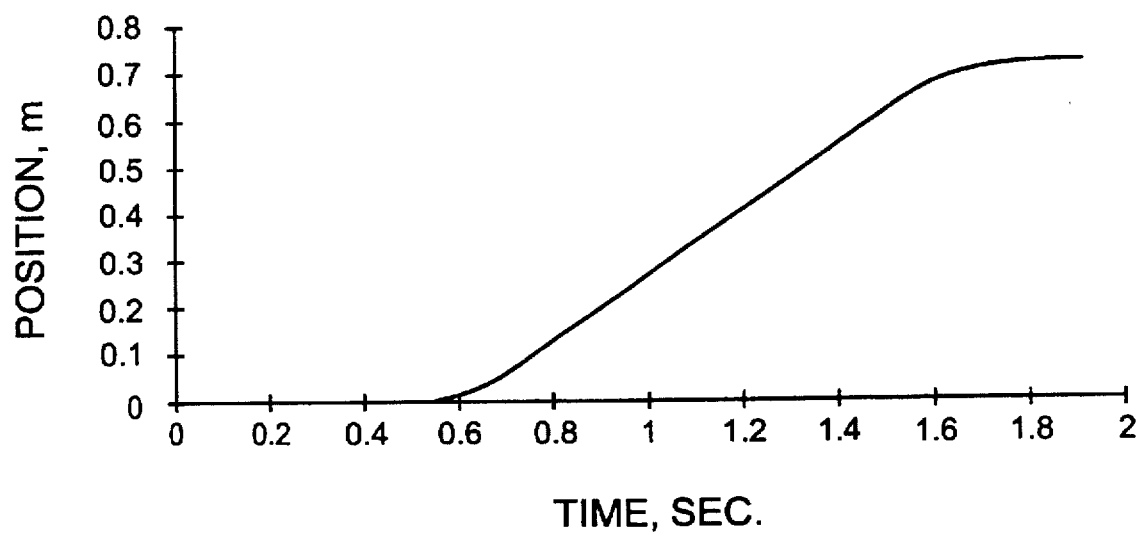
FIGS. 7-33 are exemplary motion profiles that may be executed by the mechanisms of the various package processing stations, of FIGS. 5 and 6 under control of the control system of FIG. 1.
Figure 8:
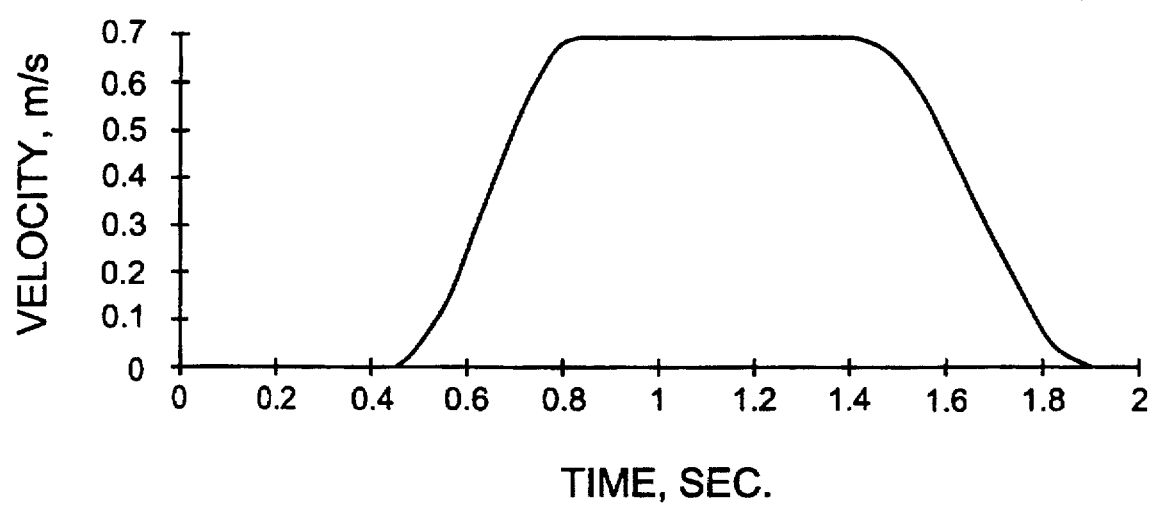
Figure 9:
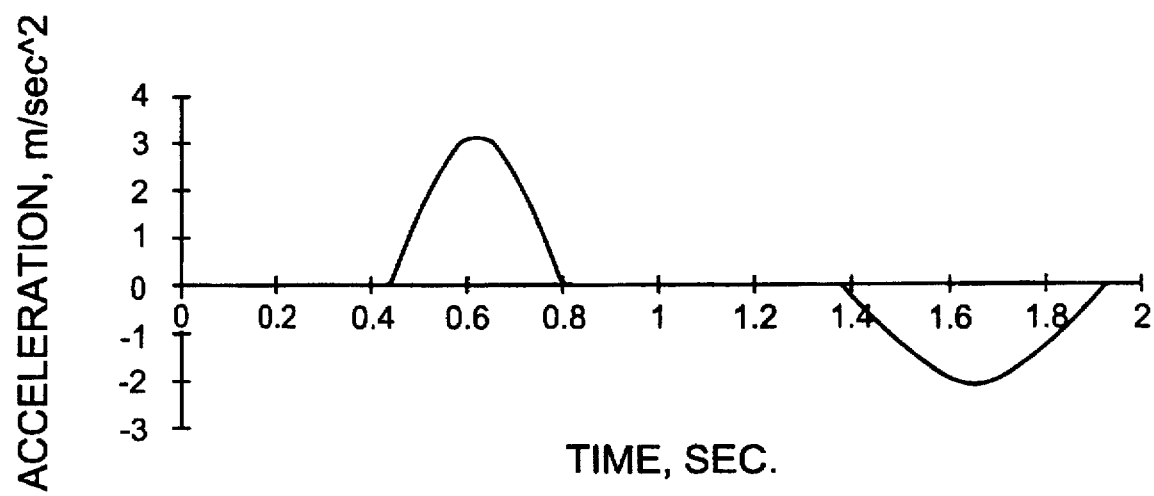

Infeed Conveyor Motion Profile:

The motion profile for the infeed (or lower) conveyor 410 is set forth in FIGS. 7–9, which illustrate the position, velocity, and acceleration profiles respectively. Sinusoidal accelerations are utilized, instead of more rapidly rising accelerations, to minimize jerking of the pulleys. The time of deceleration is made longer than the acceleration time to reduce the magnitude of deceleration. Higher pulley decelerations may cause the conveyor band to slip forward with respect to the pulley when the band is loaded with cartons thereby causing indexing errors.

Figure 10:
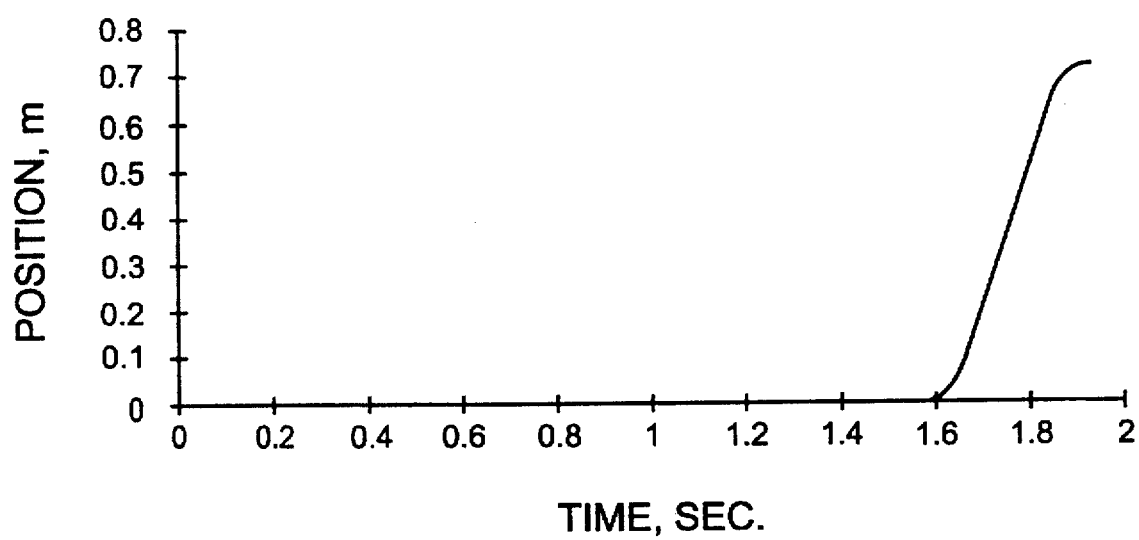
Figure 11:
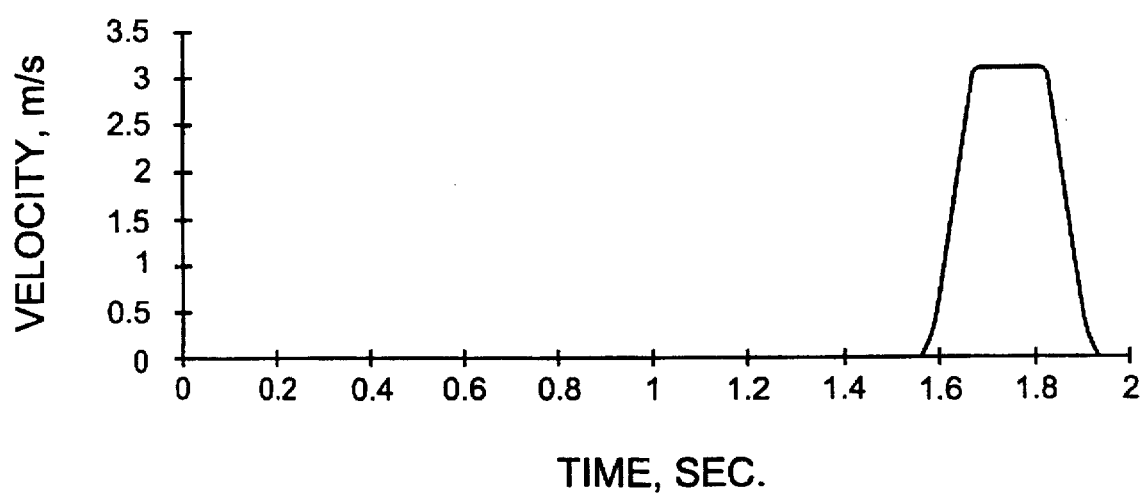
Figure 12:
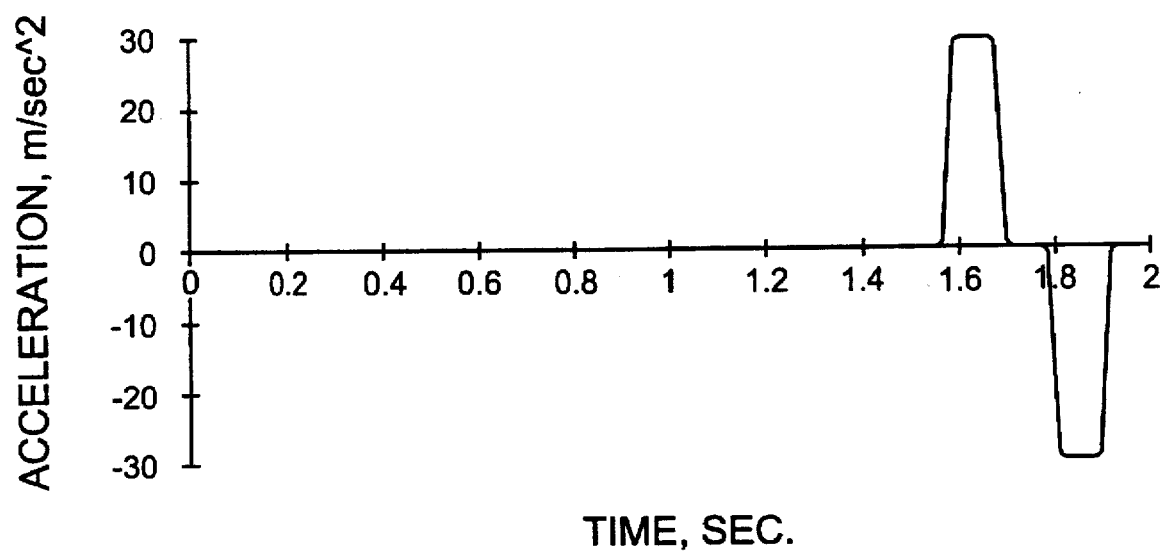

Upper Conveyor Motor Profile:

The upper conveyor 405 motion profile may proceed in accordance with the motion profile illustrated in FIGS. 10–12. This profile is basically a ⅓rd, ⅓rd, ⅓rd trapezoidal velocity profile. Higher accelerations may outstrip the ability of the servo amplifier to supply current and voltage. During the time of any acceleration (or deceleration) 20% of the time is spent ramping up to constant acceleration and 20% of the time is spent ramping down to zero acceleration. The ramping of accelerations was implemented to limit jerking of the driven mechanisms.

Lifter Motion Profile:

The lifter mechanism of station 500 is constructed in accordance with the teachings of the previously noted '410 application (Attorney Docket No. 10325US01; Corporate Docket No. TRX0043) and includes a bottom lifter and top pre-folder, each driven by a respective servomotor. The motion profiles of the lifter mechanism are set forth in FIGS. 13–15.

Figure 13:
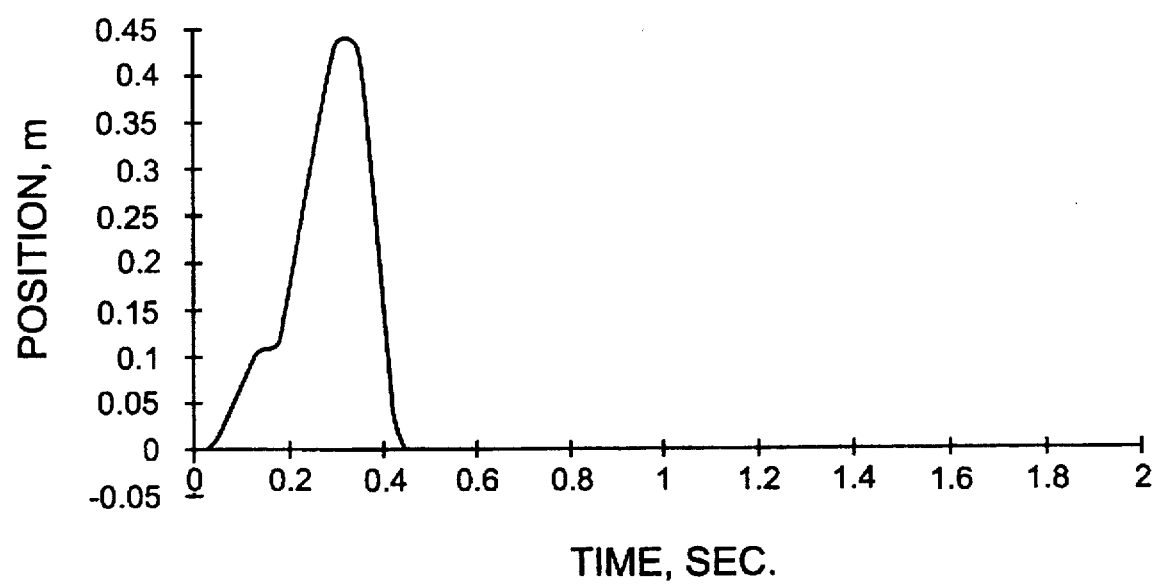
Figure 14:
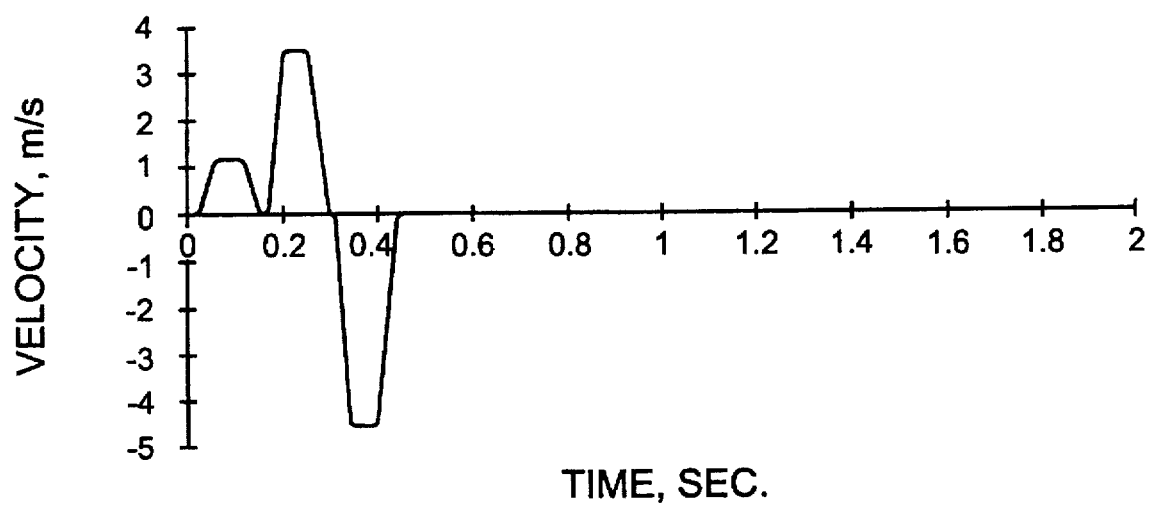
Figure 15:
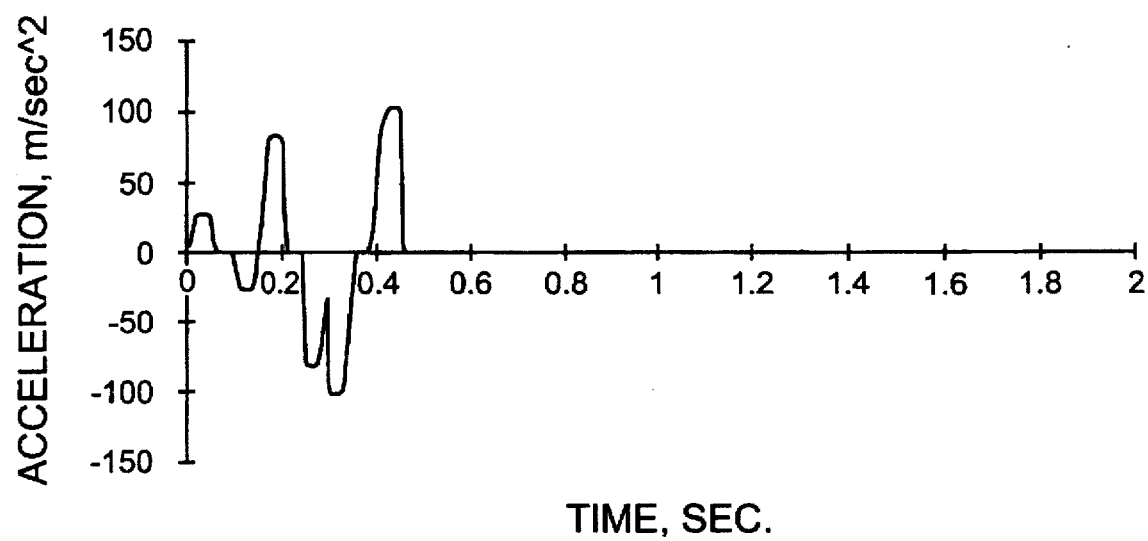

The motion profile for the bottom lifter is set forth in FIGS. 13–15 and consists of three moves. The first motor move lifts the forks up to the bottoms of the cartons in the lower conveyor band 410. The second move drives the forks up through the lower conveyor band 410 and into the upper conveyor band 415 so that the bottom sealing areas are of the cartons in the same plane as the jaws of the horn and anvil of the ultrasonic bottom sealer. The third move returns the forks down to their home position. The third move begins when the jaws of the sealer make contact with the bottom sealing areas of the cartons.

Each move of this profile is basically a ⅓rd, ⅓rd, ⅓rd trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of driven mechanisms.

Figure 16:
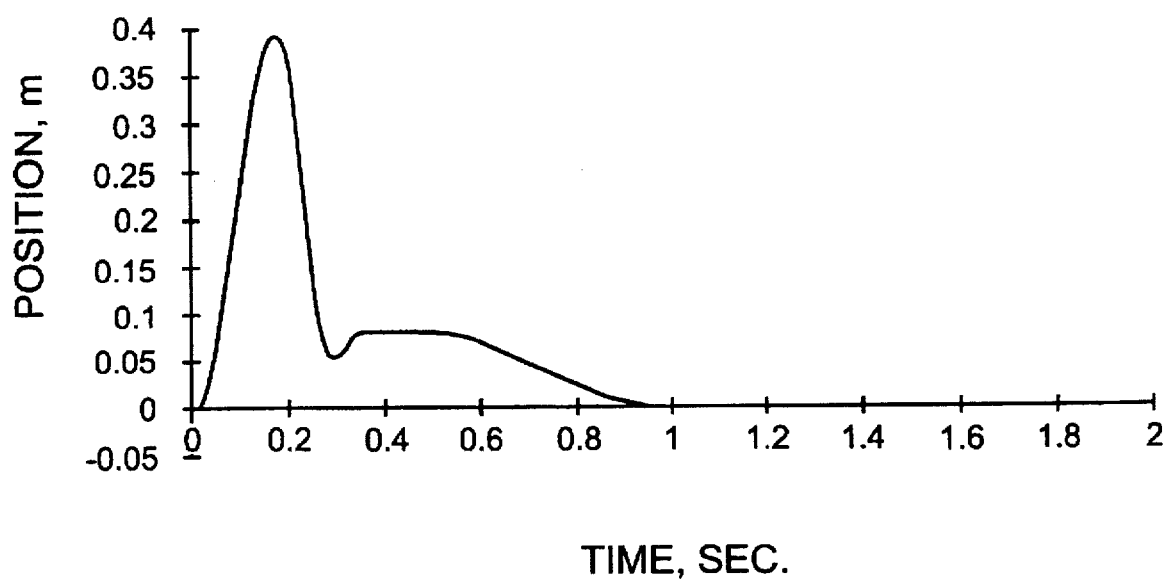
Figure 17:
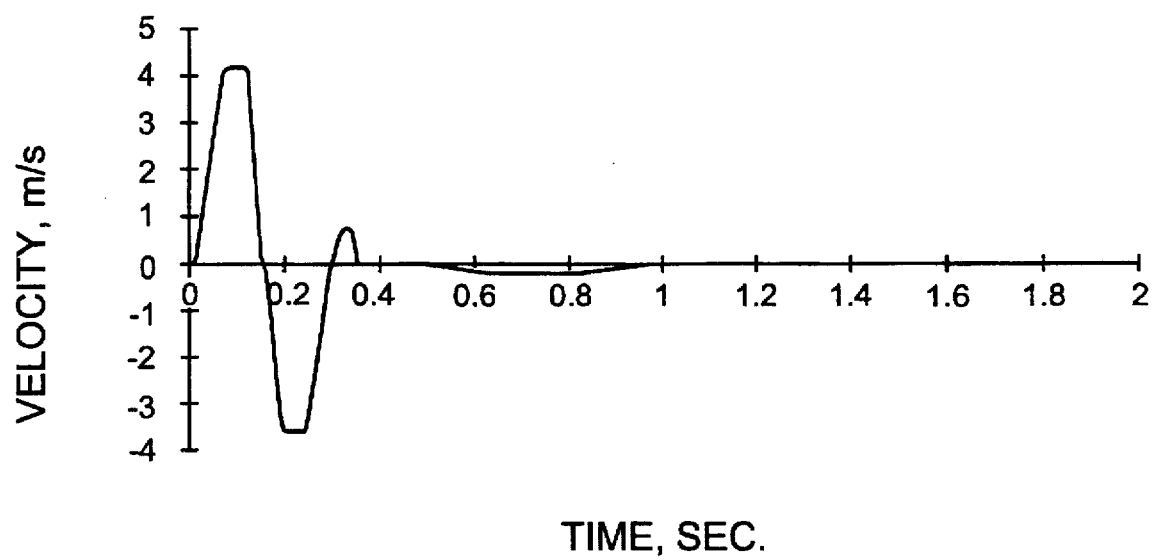
Figure 18:
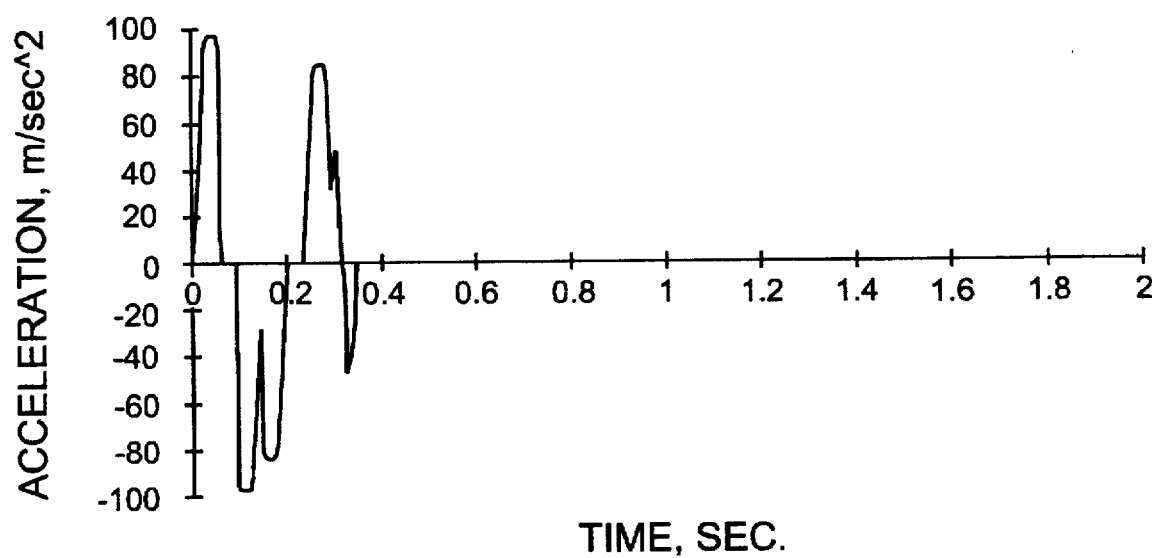

The motion profile for the top pre-folder is set forth in FIGS. 16–18 and consists of four moves. The first motor move drives the prefolder forks down through the upper conveyor band 405 into the lower conveyor band 410 to the level of the carton tops. Since the bottom lift forks arrive at the carton bottoms at the same time, the bottom lift forks and the prefolder forks secure the cartons. The second move draws the prefolder back up through the upper conveyor band 405. This second move is similar to the second move of the bottom lift but in the opposite direction so that the cartons remain secure in the grips of both sets of forks. The third move drives the prefolder down a length sufficient to keep the bottom sealing surfaces of the cartons in the same plane as that of the bottom sealer jaws during jaw closure. Without this downward move of the prefolder, the bottom sealing surfaces of the cartons would slide over the sealer jaws during their closure. The third move begins when the sealer jaws have made contact with the bottom sealing surfaces of the carton. The fourth move draws the prefolder clear of the carton tops and up to its home position sometime before the upper conveyor band 25 moves. The retraction move begins after the sealer jaws have firmly gripped the carton bottoms.

Each move of the profiles of FIGS. 16–18 is basically a ⅓rd, ⅓rd, ⅓rd trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of the driven mechanisms.

Bottom Sealer Motion Profile:

The bottom sealer of station 500 may be constructed in accordance with the teachings of the previously noted '412 application (Attorney Docket No. 10454US01; Corporate Docket No. TRX-0082). The ultrasonic bottom sealer disclosed therein includes a cam mechanism that is driven by a servomotor.

Figure 19:
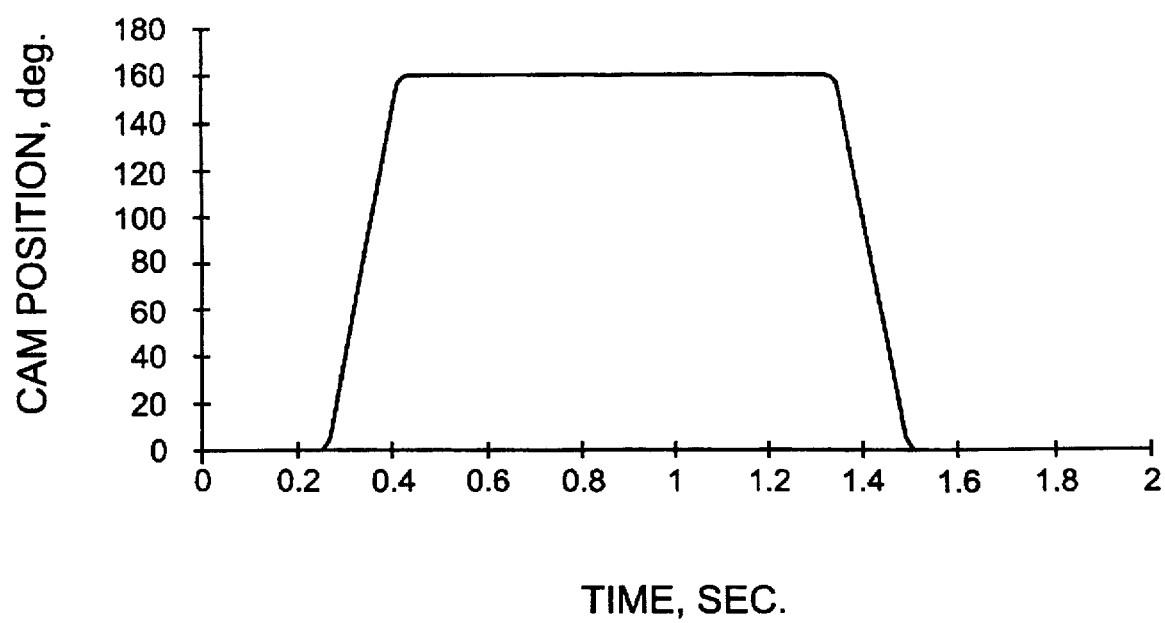
Figure 20:
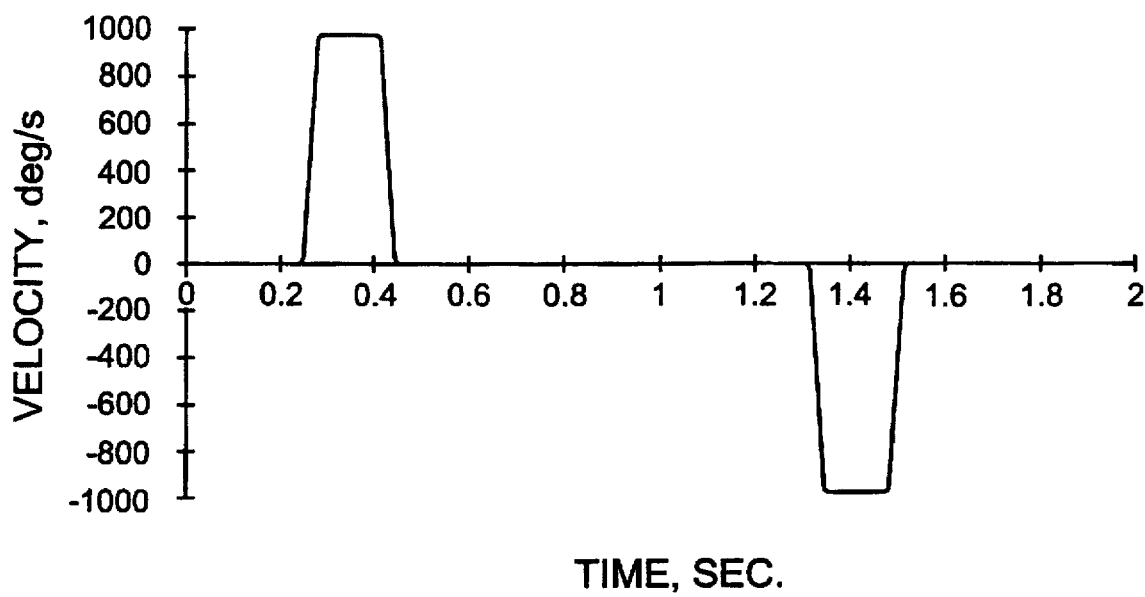
Figure 21:
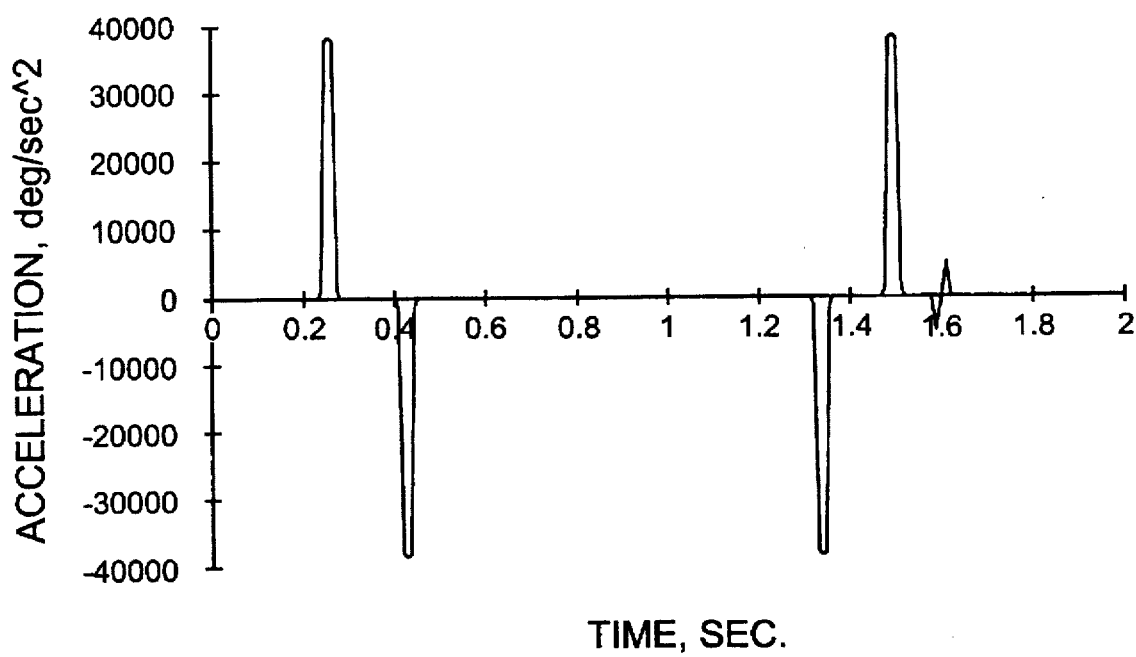

The motion profile for the bottom sealer is set forth in FIGS. 19–21 and includes two moves. The first motor move rotates the cams so that the sealer jaws close. The first motor move begins far enough in advance so that the jaws make contact with the carton bottoms just after the cannon bottoms arrive in the plane of the jaws. The second motor move rotates the cams so that the sealer jaws open. Each move spends 15% of the move time accelerating, 70% of the move time at constant velocity, and 15% of the move time decelerating. The cams are shaped to move the jaws during the constant velocity portion of the move. Thus, the possibility of adding torques required to move the jaws to torques required to accelerate the cams is avoided.

Each move of this profile is basically a 15%, 70%, 15% trapezoidal velocity profile. However, during the time of any acceleration (or deceleration) 20% of the acceleration time is spent ramping up to constant acceleration and 20% of the acceleration time is spent ramping down to zero acceleration. The ramping of accelerations was implemented to prevent jerking of the driven mechanisms.

Fill Lifter Motion Profile:

The fill lifter of processing station 510 may be constructed in accordance with the teachings of the '410 application (Attorney Docket No. 10325US01; Corporate Docket No. TRX0043) and the '401 application (Attorney Docket No. 10602US01; Corporate Docket No. TRX0044). Each of these applications, as previously noted, is incorporated by reference.

Figure 22:
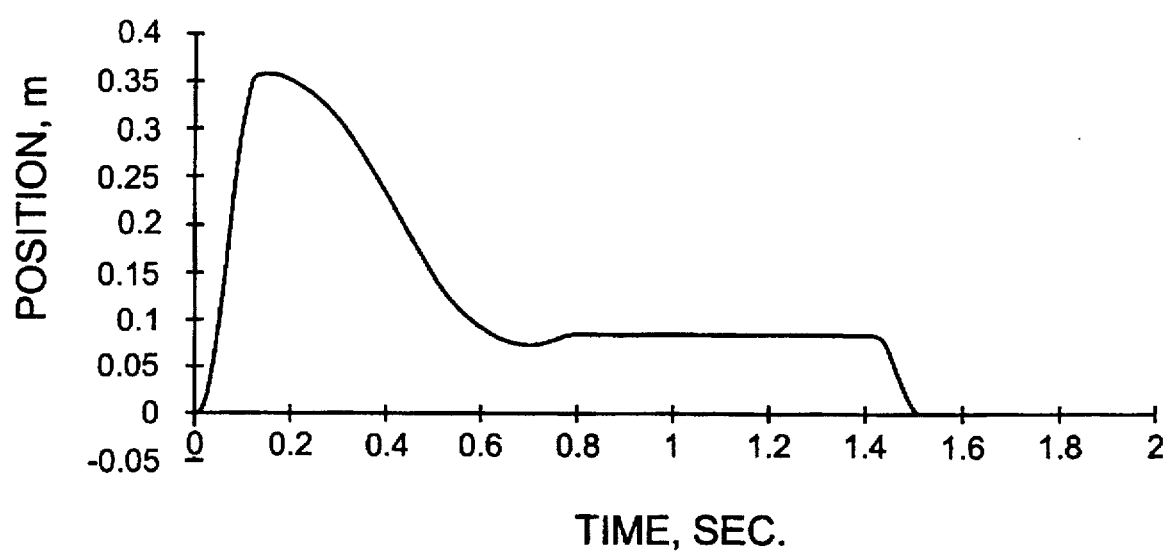
Figure 23:
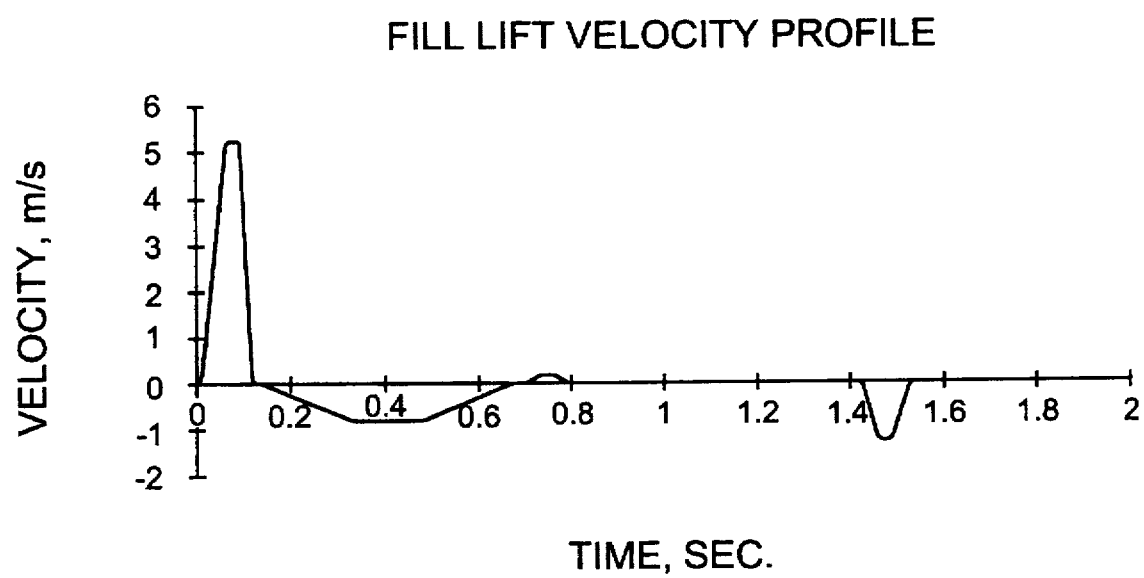

The motion profile for the lifter mechanism is set forth in FIGS. 21–23 and includes four moves. The first motor move drives the fill lift up through the upper conveyor band 405 and the cartons into the fill chambers of the filling stations proximate the fill nozzles. The distance moved is sufficient to bring the carton bottoms within a few mm of the bottom of the fill nozzles. The first move drives the lift up as quickly as possible. The accelerations have been ramped and made as small as possible to both minimize stress on the bands and couplings and to minimize demands on servo amplifier current.

The second move draws the lift down from the fill nozzle. It begins slightly after filling begins. The second move draws the lift down from the fill nozzle at velocities sufficient to keep the fill nozzle close to the level of the liquid as the liquid is dispensed. For hygienic reasons, the lifter mechanism moves down fast enough to prevent the liquid level from rising to levels that immerse the outside of the nozzles in the liquid. To minimize splashing and foam, the lift mechanism moves down slow enough to keep the liquid level close to the bottom of the nozzles. The second move ends when the top sealing areas of the cartons are in the plane of the top sealer jaws.

The third move drives the fill lift up a length sufficient to keep the top sealing surfaces of the cartons in the same plane as that of the top sealer jaws during jaw closure. Without this upward move of the fill lift, the top sealing surfaces of the carton may slide under the sealer jaws during their closure. The third move begins when the sealer jaws have made contact with the bottom sealing surfaces of the carton.

The accelerations of the third move have been limited to ~0.5 g to assist in preventing carton bulging and food spray. Food sprays are undesirable for hygiene reasons. Bulging cartons are likewise undesirable. First, they are difficult to handle without damage, because the bulging implies an internal pressure that can abet carton leaks. Further, bulging implies extra oxygen in the carton that can degrade product taste.

The fourth move draws the fill lift down to its home position sometime before the upper conveyor band 405 indexes. The retraction move begins after the sealer jaws of the top sealer have released the carton tops.

Each move of this profile is basically a 40%, 20%, 40% trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of the driven mechanisms.

Fill Pump Motion Profile:

The processing station 510 may include a fill pump that pumps liquid from a storage tank into the cartons. The fill pump includes a piston that reciprocates back and forth to alternately fill and empty a pump chamber. The piston may be driven by a screw mechanism that, in turn, is driven by a servomotor.

Figure 24:
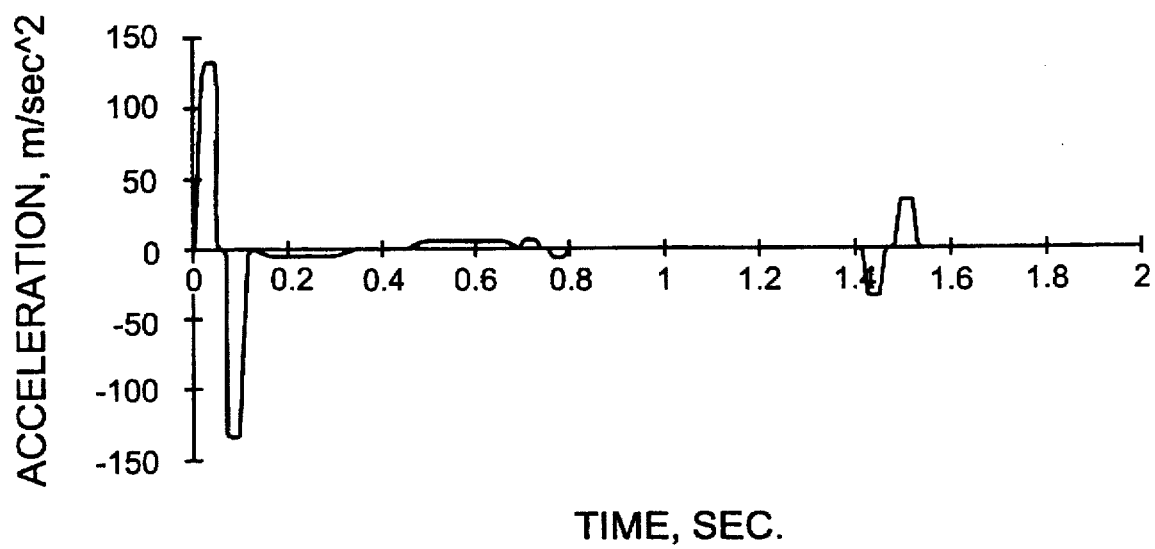
Figure 25:
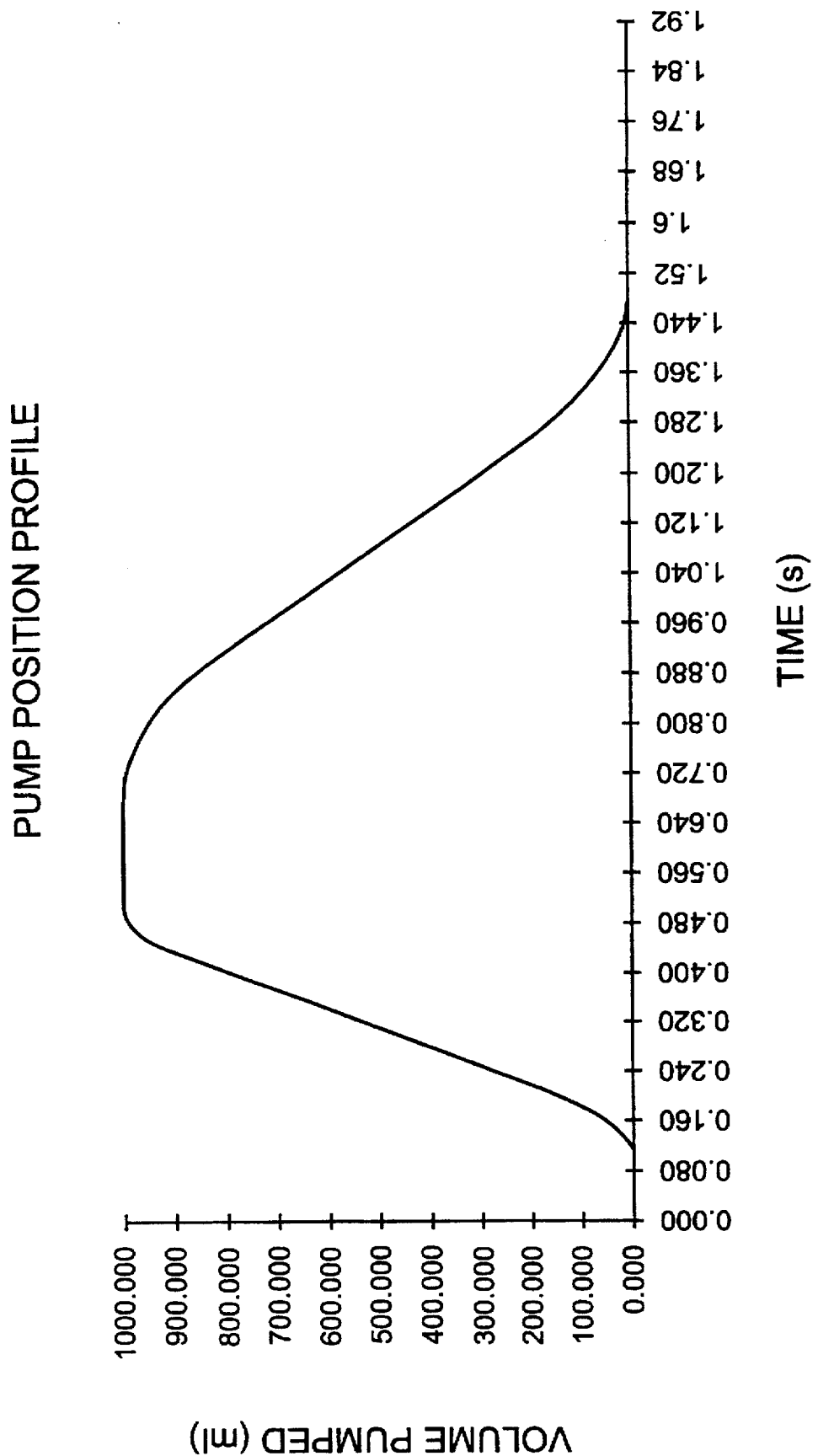
Figure 26:
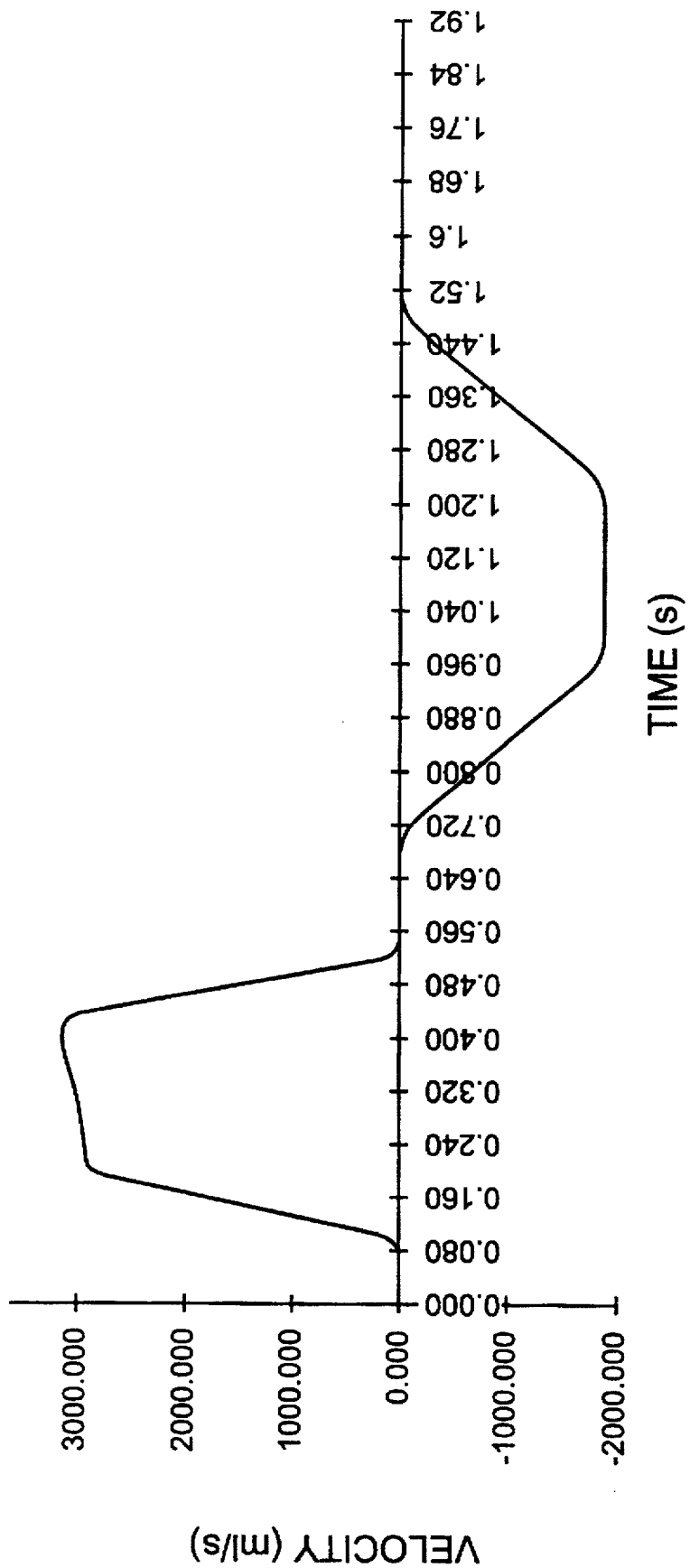

The motion profile for the fill pump is illustrated in FIGS. 24–26 and includes two moves. The first move, the fill move, drives the pump piston forward to drive liquid down through the fill nozzle and into the carton. The second move, the recharge move, drives the pump piston backward to draw liquid from the storage tank into the pump chamber.

The aim of the fill move is to get liquid into the carton as fast as possible. However, pump velocities must be kept below those velocities that cause unacceptable splash and foaming. During the first part of the fill move (the "acceleration" part of the move) the velocities can be, and are, increased dramatically as the liquid depth increases. After some characteristic depth is achieved, the rate of increase in liquid velocities must be slowed to keep splash and foaming to acceptable levels. This defines the second part (the "almost-constant-velocity" part) of the move.

During the third part of the fill move, deceleration is done as quickly as possible. The magnitude of the deceleration is related to the time required to close the outlet valve so that the liquid flow reaches zero at the same time that the outlet valve is closed. If the valve closes too early, an incorrect volume will be delivered to the package. Additionally, if the pump piston continues its stroke after the outlet valve closes, the increased fluid pressures will force a spray of liquid through the pump housing and diaphragm and out to various parts of the machine. Such an event compromises the hygiene of the machine. If the valve closes too late, then air will enter the nozzle and the pump chamber which will, again, cause an incorrect volume to be delivered to the package. The faster the deceleration, the more precise the timing of the valve closing has to be.

During the recharge move, accelerations and velocities are limited to prevent gasses from coming out of solution due to pressure reductions. Gas bubbles in the fill pump chamber may cause inaccurate liquid volumes to be delivered to the package. Pump accelerations are kept below those that keep flow accelerations below 1 g. Pump velocities are kept below those that enable flow velocities of 2 m/s or greater in the recharge pipes.

Top Sealer Motion Profile:

The top sealer of station 510 is, for example, constructed in accordance with the teachings of the '412 application (Attorney Docket No. 10454US01; Corporate Docket No. TRX-0082). That application, as noted above, is incorporated by reference.

Figure 27:
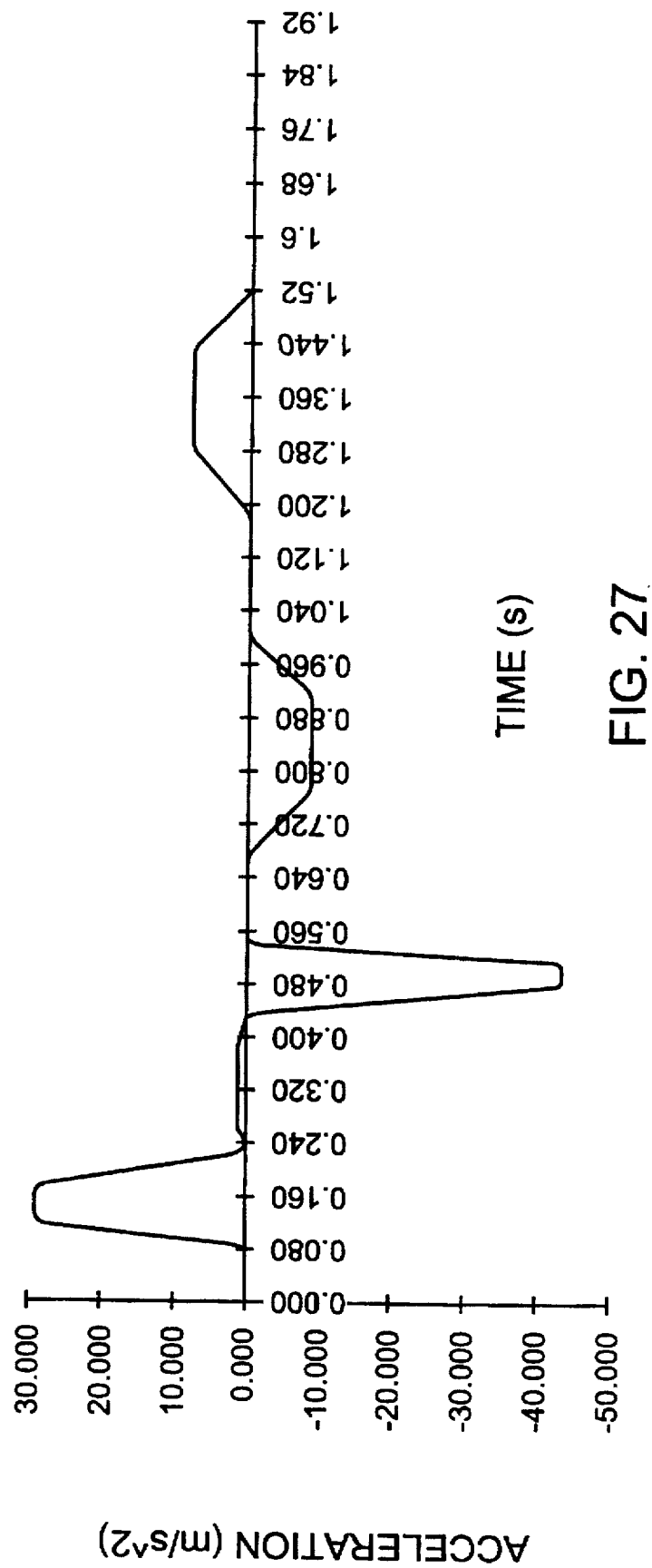
Figure 28:
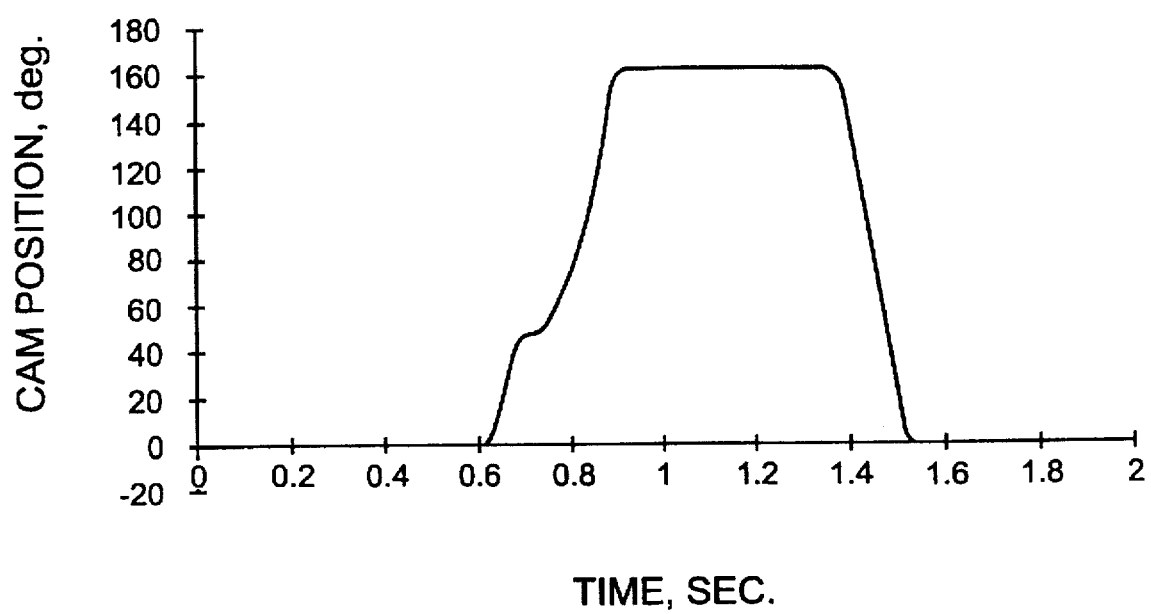
Figure 29:
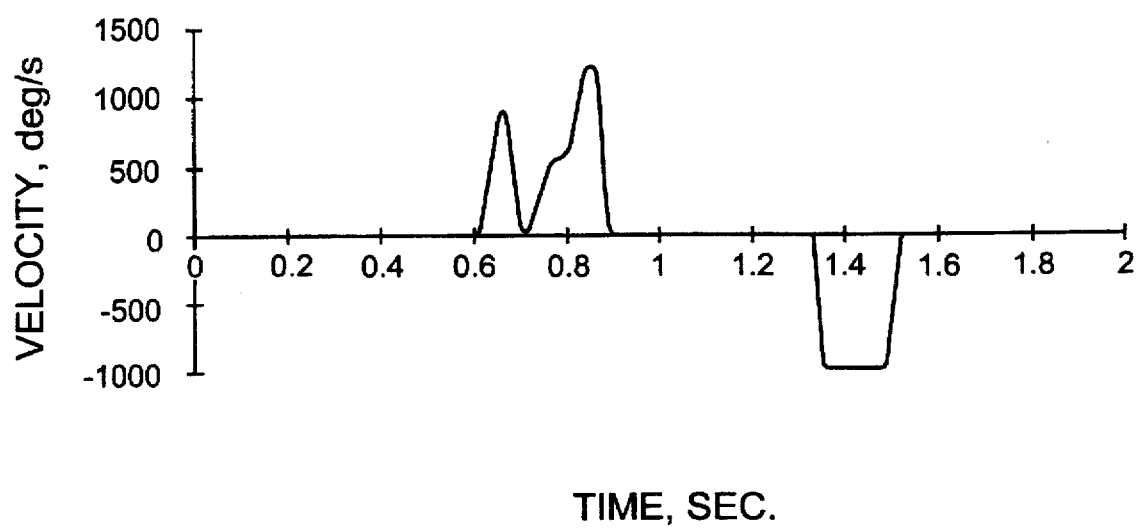

The motion profile for the top sealer is set forth in FIGS. 27–29 and includes two moves which drive the cam. The first move of this profile closes the top sealer jaws. It is an atypical move consisting of three polynomial splines. The first spline rotates the cams so that the jaws make contact with the top sealing areas of the cartons simultaneously with their arrival at the jaws. The cams arrive at that point with a very low velocity. The low cam velocity is selected so that the jaw velocities are small enough to give refold mechanisms, such as those described in U.S. Ser. No. 08/315,400 filed Sep. 28, 1994 (Attorney Docket No. 10455US01; Corporate Docket No. TRX-0047), entitled "Apparatus for Sealing the Fin of a Gabled Container", incorporated herein by reference, time to shape the carton tops for proper folding. At the same time it is desirable to have a velocity greater than zero so that the subsequent acceleration can be instituted without having to overcome static friction.

The second spline of the move rotates the cams until the jaws, and thus the carton tops, are about 5 mm apart. It is desired that this move last 100 ms to continue giving time to allow the refold mechanisms to fold the cartons and, further, to allow excess air to escape from the cartons. It is also desired that the velocity at the end of the second spline be as low as possible while still enabling the jaws to finish closing in the next 100 ms via the third spline. The low velocity at the end of the second spline (and, thus, at the beginning of the third spline) extends the time for air escapement into the third spline. The third spline has to decelerate as fast as possible to complete the cam rotation and jaw closing in the allotted 100 ms.

The second move opens the top sealer jaws and is the same as the move that opens the bottom sealer jaws. That is, the move spends 15% of the move time accelerating, 70% of the move time at constant velocity, and 15% of the move time decelerating. During the time of any acceleration (or deceleration) 20% of the time is spent ramping down to zero acceleration. The ramping of accelerations is implemented to reduce jerking of the driven mechanisms.

Bottom Former Lift Motion Profile:

Processing station 515 includes a bottom former that forms a flattened seating area from the gabled bottom of each carton. The bottom former may be constructed in accordance with the teachings of the '403 application (Attorney Docket No. 10599US01; Corporate Docket No. TR-X0064). The bottom former thus includes a cup array that forms the carton bottoms and, further, transfers the cartons from the upper conveyor 405 to the outfeed mechanism. The cup array is moved by a linear activator (lifter) that is driven by a servomotor.

Figure 30:
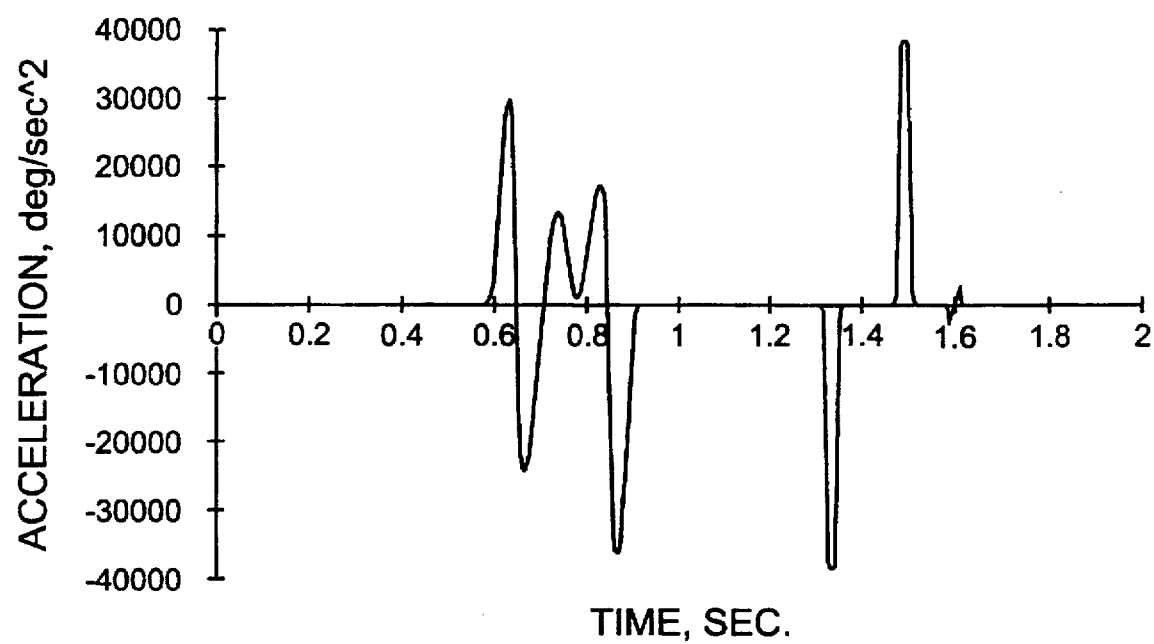
Figure 31:
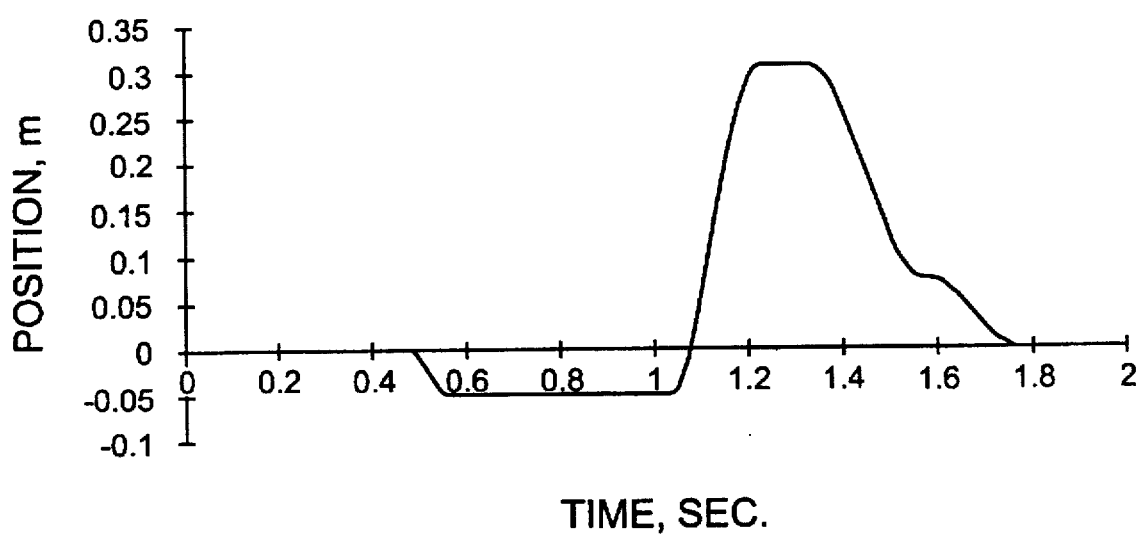
Figure 32:
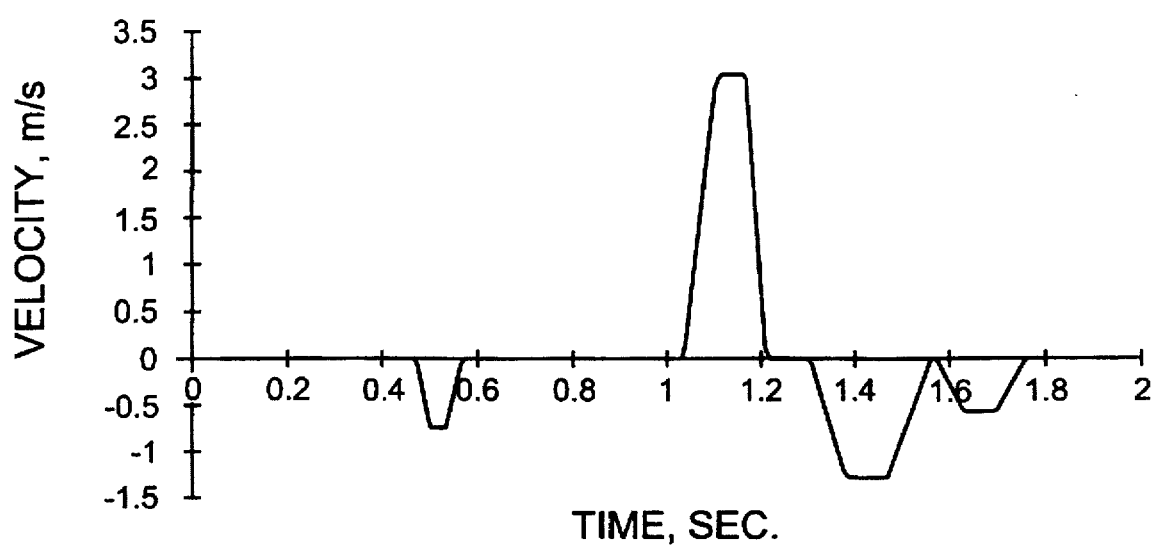
Figure 33:
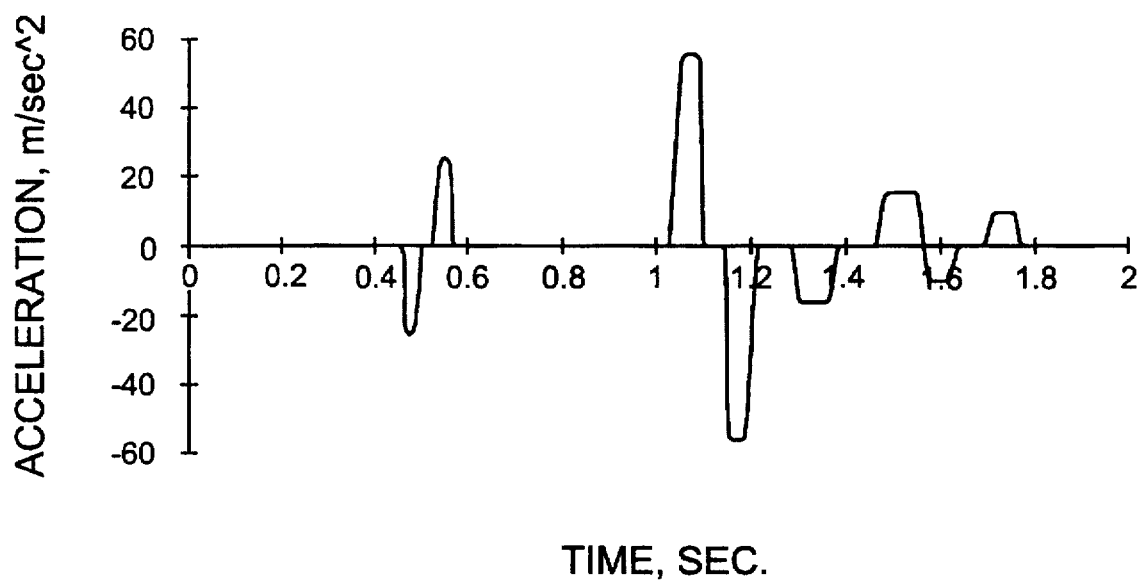

The motion profile for the lifter is set forth in FIGS. 30–32. The motion profile begins with the cartons already in the cups of the array. At this point the cups can move down whereas the cartons can not move down any further. The first motor move drives the cups down a sufficient distance to allow the ejecting mechanisms to drive the cartons from the cups and assure that the top edges of cups cannot "trip" the cartons when they are pushed horizontally out of the station. The cups have to remain at that level long enough for the pusher of the outfeed mechanism to shove the cartons out and then retract back out of the upward path of the cups.

The second move of the profile begins as soon as the pushers are clear of the upward path of the cups. The second move drives the lift up as fast as the servo amplifier can allow. Within the accelerations (or decelerations) of this move 20% of the time is spent ramping up to constant acceleration and 20% of the time is spent ramping down to zero acceleration. The ramping of accelerations is implemented to reduce jerking of the driven mechanisms. After the lift has finished the move up, it must dwell there long enough to allow the cup vacuum to drive the carton bottoms firmly into the cups.

After the dwell, the third move takes the cup array down as quickly as is necessary to reach a level at which the cartons are below any mechanism that would otherwise collide with the cartons and/or lift when the conveyor indexes. The smallest accelerations that enable the avoidance of collisions are desirable, first, to prevent the cups from leaving the cartons behind and, second, to keep the bottom folds of the carton as tight against the cup bottoms as possible.

The fourth move does not have to cope with any abnormal demands and, thus, is a leisurely drop down to the home position.

Although the present invention has been described with reference to specific embodiments, those of skill in the art will recognize that changes may be made thereto without departing from the scope and spirit of the invention as set forth in the appended claims.

What is claimed is:

1. A control system for driving a movable component of an apparatus comprising:

a) a servomotor connected to indirectly drive the movable component from a start position to an end position;

b) a flag member disposed for co-movement with the movable component, the flag member being at a first position when the movable component is at the start position and at a second position when the movable component is at the end position;

c) a sensor disposed at a third position between the first and second positions and generating an output signal in response to a motion characteristic of the flag member when the flag member reaches the third position;

d) a controller for driving the servomotor in accordance with a predetermined motion profile, the predetermined motion profile defining motion characteristics of the movable component as the movable component moves from the start position to the end position within a predetermined time frame, the controller being responsive to the output signal to alter the predetermined motion profile; and e) first and second end position sensors disposed proximate the second position and generating an end position signal to the controller when the flag member reaches the second position, the first and second end position sensors being spaced apart a distance corresponding to a width of the flag member along a direction of travel of the flag member.

2. A control system as claimed in claim 1 wherein the controller is responsive to the output signal to alter the predetermined motion profile so that the movable component reaches the end position by the end of the predetermined time frame.

3. A control system as claimed in claim 1 wherein the motion characteristic is the position of the flag member.

4. A control system as claimed in claim 1 wherein the motion characteristic is the speed of the flag member when the flag member is at the third position.

5. A control system as claimed in claim 1 wherein the output signal indicates a time at which the flag member reaches the third position.

6. A control system as claimed in claim 1 wherein the sensor is an infrared sensor.

7. A control system as claimed in claim 1 wherein the sensor is a Hall effect sensor.

8. A control system as claimed in claim 1 wherein the sensor is a mechanical switch.

9. A control system as claimed in claim 1 wherein the flag member is affixed to the movable component.

10. A control system as claimed in claim 1 and further comprising a gearbox connected between the movable component and the servomotor to allow the servomotor to indirectly drive the movable component.

11. A control system as claimed in claim 1 and further comprising a belt connected between the movable component and the servomotor to allow the servomotor to indirectly drive the movable component.

12. A control system for driving a movable component of an apparatus comprising:

a) a servomotor connected to indirectly drive the movable component from a start position to an end position;

b) a flag member connected for co-movement with the movable component as the movable component moves from the start position to the end position, the flag member being disposed at a first position when the movable component is at the start position and being disposed at a second position when the movable component is at the end position;

c) a sensor fixed between the first and second positions and generating an output signal indicative of the flag member reaching a third position between the first and second positions;

d) a controller for driving the servomotor in accordance with a predetermined motion profile, the predetermined motion profile defining motion characteristics of the movable component as the movable component moves from the start position to the end position within a predetermined time frame, the controller detecting a time of occurrence of the output signal and comparing the time of occurrence with a reference time, comparison between the time of occurrence and the reference time being used by the controller to alter the predetermined motion profile to assist the movable component in reaching the end position by the end of the predetermined time frame; and e) first and second end position sensors disposed proximate the second position and generating an end position signal to the controller when the flag member reaches the second position, the first and second end position sensors being spaced apart a distance corresponding to a width of the flag member along a direction of travel of the flag member.

13. A control system as claimed in claim 12 and further comprising a gearbox connected between the movable component and the servomotor to allow the servomotor to indirectly drive the movable component.

14. A control system as claimed in claim 12 and further comprising a belt connected between the movable component and the servomotor to allow the servomotor to indirectly drive the movable component.

15. A control system as claimed in claim 12 and further comprising an end position sensor disposed at the second position and generating an end position signal to the controller when the flag member reaches the second position.

16. A control system as claimed in claim 12 and further comprising first and second end position sensors disposed proximate the second position and generating an end position signal to the controller when the flag member reaches the second position, the first and second end position sensors being spaced apart a distance corresponding to a width of the flag member along a direction of travel of the flag member.

17. A control system as claimed in claim 12 wherein the sensor is an infrared sensor.

18. A control system as claimed in claim 12 wherein the sensor is a Hall effect sensor.

19. A control system as claimed in claim 12 wherein the sensor is a mechanical switch.

20. A control system as claimed in claim 12 wherein the flag member is affixed to the movable component.

21. A packaging machine comprising:

a) a plurality of packaging stations, each of the packaging stations executing one or more processes to fill and seal a plurality of packages;

b) an endless belt conveyor carrying the plurality of packages;

c) a servomotor connected to drive the endless belt conveyor through an intermediate drive mechanism to thereby transport the plurality of packages between the plurality of packaging stations;

c) a flag member connected for co-movement with the endless belt conveyor;

d) a controller for driving the servomotor in accordance with a predetermined motion profile, the predetermined motion profile defining motion characteristics of the endless belt conveyor as the endless belt conveyor moves from an index start position to an index end position within a predetermined time frame;

e) a sensor fixed between the index start position and the index end position and generating an output signal indicative of the flag member reaching a predetermined position between the index start position and the index end position, the controller detecting a time of occurrence of the output signal and comparing the time of occurrence with a reference time, comparison between the time of occurrence and the reference time being used by the controller to alter the predetermined motion profile to assist the endless belt conveyor in reaching the index end position by the end of the predetermined time frame; and f) first and second index end position sensors disposed proximate the index end position and generating an index end position signal to the controller when the flag member reaches the index end position, the first and second index end position sensors being spaced apart a distance corresponding to a width of the flag member along a direction of travel of the flag member.

22. A packaging machine as claimed in claim 21 wherein the intermediate drive mechanism comprises a gear box connected between the movable component and the servomotor.

23. A packaging machine as claimed in claim 21 wherein the intermediate drive mechanism comprises a belt connected between the movable component and the servomotor.

24. A packaging machine as claimed in claim 21 wherein the sensor is an infrared sensor.

25. A packaging machine as claimed in claim 21 wherein the sensor is a Hall effect sensor.

26. A packaging as claimed in claim 21 wherein the sensor is a mechanical switch.

27. A packaging machine as claimed in claim 21 and further comprising first and second index end position sensors disposed proximate the index end position and generating an index end position signal to the controller when the flag member reaches the index end position, the first and second index end position sensors being spaced apart a distance corresponding to a width of the flag member along a direction of travel of the flag member.

28. A packaging machine as claimed in claim 21 wherein the flag member is affixed on the endless belt conveyor.

29. A packaging machine comprising:

a) a plurality of packaging stations, each of the packaging stations executing one or more processes to fill and seal a plurality of packages;

b) an endless belt conveyor carrying the plurality of packages;

c) a servomotor connected to drive the endless belt conveyor through an intermediate drive mechanism to thereby transport the plurality of packages between the plurality of packaging stations;

d) a flag member connected for co-movement with the endless belt conveyor;

e) a controller for driving the servomotor in accordance with a predetermined motion profile, the predetermined motion profile defining motion characteristics of the endless belt conveyor as the endless belt conveyor moves from an index start position to an index end position within a predetermined time frame;

f) a sensor fixed between the index start position and the index end position and generating an output signal indicative of the flag member reaching a predetermined position between the index start position and the index end position, the controller being responsive to the output signal to alter the predetermined motion profile to assist the endless belt conveyor in reaching the index end position by the end of the predetermined time frame; and g) first and second index end position sensors disposed proximate the index end position and generating an index end position signal to the controller when the flag member reaches the index end position, the first and second index end position sensors being spaced apart a distance corresponding to a width of the flag member along a direction of travel of the flag member.

30. A packaging machine as claimed in claim 29 wherein the intermediate drive mechanism comprises a gear box connected between the endless belt conveyor and the servomotor.

31. A packaging machine as claimed in claim 29 wherein the intermediate drive mechanism comprises a belt connected between the endless belt conveyor and the servomotor.

32. A packaging machine as claimed in claim 29 wherein the sensor is an infrared sensor.

33. A packaging machine as claimed in claim 29 wherein the sensor is a Hall effect sensor.

34. A packaging as claimed in claim 29 wherein the sensor is a mechanical switch.

35. A packaging machine as claimed in claim 29 and further comprising first and second index end position sensors disposed proximate the index end position and generating an index end position signal to the controller when the flag member reaches the index end position, the first and second index end position sensors being spaced apart a distance corresponding to a width of the flag member along a direction of travel of the flag member.

36. A packaging machine as claimed in claim 29 wherein the flag member is affixed on the endless belt conveyor.

37. A packaging machine comprising:

a) a plurality of packaging stations, each of the packaging stations executing one or more processes to fill and seal a plurality of packages;

b) an endless belt conveyor carrying the plurality of packages;

c) a servomotor connected to drive the endless belt conveyor through an intermediate drive mechanism to thereby transport the plurality of packages between the plurality of packaging stations;

d) a controller for driving the servomotor in accordance with a predetermined indexed motion profile, the predetermined indexed motion profile defining motion characteristics of the endless belt conveyor as the endless belt conveyor moves from an index start position to an index stop position within a predetermined time frame;

e) a plurality of flag members connected to the endless belt conveyor and disposed from one another a distance substantially equal to the distance that the conveyor travels between the index start position and the index stop position; and f) first and second sensors disposed proximate the conveyor, the first sensor being fixed between the index start position and the index stop position and generating a first output signal indicative of one of the plurality of flag members reaching a predetermined position between the index start position and the index stop position, the second sensor being disposed at the index stop position and generating a second output signal indicative of said one of the plurality of flag members reaching the index stop position, the controller being responsive to the first output signal to alter the predetermined motion profile to assist the endless belt conveyor in reaching the index stop position, as indicated by the second output signal, by the end of the predetermined time frame.

38. A packaging machine as claimed in claim 37 wherein the intermediate drive mechanism comprises a gear box connected between the endless belt conveyor and the servomotor.

39. A packaging machine as claimed in claim 37 wherein the intermediate drive mechanism comprises a belt connected between the endless belt conveyor and the servomotor.

40. A packaging machine as claimed in claim 37 wherein the sensor is an infrared sensor.

41. A packaging machine as claimed in claim 37 wherein the sensor is a Hall effect sensor.

42. A packaging as claimed in claim 37 wherein the sensor is a mechanical switch.

43. A packaging machine as claimed in claim 37 wherein the second sensor comprises two position sensors disposed proximate the index end position and generating an index stop position signal to the controller when the flag member reaches both of the sensors, the two sensors being spaced apart a distance corresponding to a width of the flag member along a direction of travel of the flag member.

44. A packaging machine comprising:

a) a plurality of packaging stations, each of the packaging stations executing one or more processes to fill and seal a plurality of packages;

b) an endless belt conveyor carrying the plurality of packages;

c) a servomotor connected to drive the endless belt conveyor through an intermediate drive mechanism to thereby transport the plurality of packages between the plurality of packaging stations;

d) a controller for driving the servomotor in accordance with a predetermined indexed motion profile, the predetermined indexed motion profile defining motion characteristics of the endless belt conveyor as the endless belt conveyor moves from an index start position to an index stop position within a predetermined time frame;

e) a plurality of flag members connected to the endless belt conveyor and disposed from one another a distance substantially equal to the distance that the conveyor travels between the index start position and the index stop position;

f) first and second sensors disposed proximate the conveyor, the first sensor being fixed between the index start position and the index stop position and generating a first output signal indicative of one of the plurality of flag members reaching a predetermined position between the index start position and the index stop position, the second sensor being disposed at the index stop position and generating a second output signal indicative of said one of the plurality of flag members reaching the index stop position, the controller detecting a time of occurrence of the first output signal and comparing the time of occurrence with a reference time, comparison between the time of occurrence and the reference time being used by the controller to alter the predetermined motion profile to assist the endless belt conveyor in reaching the index stop position, as indicated by the second output signal, by the end of the predetermined time frame.

45. A packaging machine as claimed in claim 44 wherein the sensor is an infrared sensor.

46. A packaging machine as claimed in claim 44 wherein the sensor is a Hall effect sensor.

47. A packaging as claimed in claim 44 wherein the sensor is a mechanical switch.

48. A packaging machine as claimed in claim 44 wherein the second sensor comprises two position sensors disposed proximate the index end position and generating an index stop position signal to the controller when the flag member reaches both of the sensors, the two sensors being spaced apart a distance corresponding to a width of the flag member along a direction of travel of the flag member.

49. A packaging machine as claimed in claim 44 wherein the intermediate drive mechanism comprises a gear box connected between the movable component and the servomotor.

50. A packaging machine as claimed in claim 44 wherein the intermediate drive mechanism comprises a belt connected between the movable component and the servomotor.

* * * * *